US012802475B2

(12) United States Patent
Jain et al.

(10) Patent No.: US 12,802,475 B2
(45) Date of Patent: Nov. 17, 2026

(54) VECTOR TEXT EXTRACTION

(71) Applicant: Adobe Inc., San Jose, CA (US)

(72) Inventors: Arushi Jain, Delhi (IN); Praveen Kumar Dhanuka, Howrah (IN)

(73) Assignee: Adobe Inc., San Jose, CA (US)

( * ) Notice: Subject to any disclaimer, the term of this patent is extended or adjusted under 35 U.S.C. 154(b) by 268 days.

(21) Appl. No.: 18/766,290

(22) Filed: Jul. 8, 2024

(65) Prior Publication Data

US 2026/0011165 A1 Jan. 8, 2026

(51) Int. Cl.
*G06K 9/00* (2022.01)
*G06V 10/25* (2022.01)
*G06V 30/10* (2022.01)

(52) U.S. Cl.
CPC .............. *G06V 30/10* (2022.01); *G06V 10/25* (2022.01)

(58) Field of Classification Search
CPC .......... G06F 40/30; G06F 16/93; G06F 40/20; G06F 16/338; G06F 40/103; G06F 16/24578; G06F 40/279; G06F 40/35; G06F 40/40; G06F 16/248; G06F 16/3344; G06F 16/322; G06F 16/35; G06F 18/214; G06F 16/951; G06F 2111/16; G06F 16/2237; G06F 16/3334; G06F 16/3347; G06F 16/345; G06F 16/383; G06F 2216/11; G06F 40/117; G06F 40/268; G06F 40/284; G06F 16/3326; G06F 16/334; G06F 16/3349; G06F 16/367; G06N 3/09; G06N 3/045; G06N 20/00; G06N 3/044; G06N 3/08; G06N 3/0455; G06N 3/0464; G06N 3/048; G06N 3/096; G06N 3/084; G06N 3/0895; G06N 3/0499; G06N 3/063
See application file for complete search history.

(56) References Cited

U.S. PATENT DOCUMENTS

| | | | | |
|---|---|---|---|---|
| 5,872,573 | A * | 2/1999 | Adegeest | G06T 11/60 345/621 |
| 2002/0051575 | A1 * | 5/2002 | Myers | G06V 20/63 382/202 |
| 2013/0346443 | A1 * | 12/2013 | Kataoka | G06F 16/322 707/769 |

* cited by examiner

*Primary Examiner* — Alex Kok S Liew
(74) *Attorney, Agent, or Firm* — Keller Preece PLLC

(57) ABSTRACT

The present disclosure is directed toward systems, methods, and non-transitory computer readable media that that extract vector text from vector images using a multistep approach that involves content analysis, candidate outline filtering, and conditional candidate outline pruning. In particular, in one or more embodiments, the disclosed systems utilize an optical character recognition model to extract textual content as well as bounding boxes corresponding to the textual content from within vector images. The disclosed systems determine a set of intersecting vector paths that overlap the bounding boxes corresponding to the textual content. The disclosed systems apply various constraints to the set of intersecting paths to filter the paths and determine a set of text vector paths that outlines the textual content.

20 Claims, 17 Drawing Sheets

800

VECTOR TEXT EXTRACTION

BACKGROUND

Advancements in computing devices and computer design applications have led to innovative developments in computer image design and editing software. For example, certain computer design applications enable the editing and manipulation of digital images utilizing vector paths to generate a diverse range of digital designs. However, despite these advances, current vector-based applications are limited in their ability to extract vector text, especially from vector images with complex vector paths. As a result, extracting vector text within vector images remains a tedious procedure that often requires cleanup processes to fix the error prone selection of individual vector paths. Consequently, existing image editing systems have a number of shortcomings with regard to flexibility, efficiency, and accuracy when extracting vector paths outlining textual content within vector images.

SUMMARY

One or more embodiments provide benefits and/or solve one or more of the foregoing or other problems in the art with systems, methods, and non-transitory computer readable storage media that extract vector text from vector images using a multistep approach that involves content analysis, candidate outline filtering, and conditional candidate outline pruning. In particular, the disclosed systems utilize an optical character recognition model to extract textual content as well as bounding boxes corresponding to the textual content from within vector images. The disclosed systems determine a set of intersecting vector paths that overlap the bounding boxes corresponding to the textual content. Further, the disclosed systems apply various constraints to the set of intersecting paths to filter the paths and determine a set of text vector paths that outlines the textual content. In addition, the disclosed systems select the text vector paths corresponding to the textual content with few user interactions (e.g., a single click) for use in downstream processes.

BRIEF DESCRIPTION OF THE DRAWINGS

This disclosure will describe one or more example embodiments of the systems and methods with additional specificity and detail by referencing the accompanying figures. The following paragraphs briefly describe those figures, in which.

DETAILED DESCRIPTION

Figure 1:
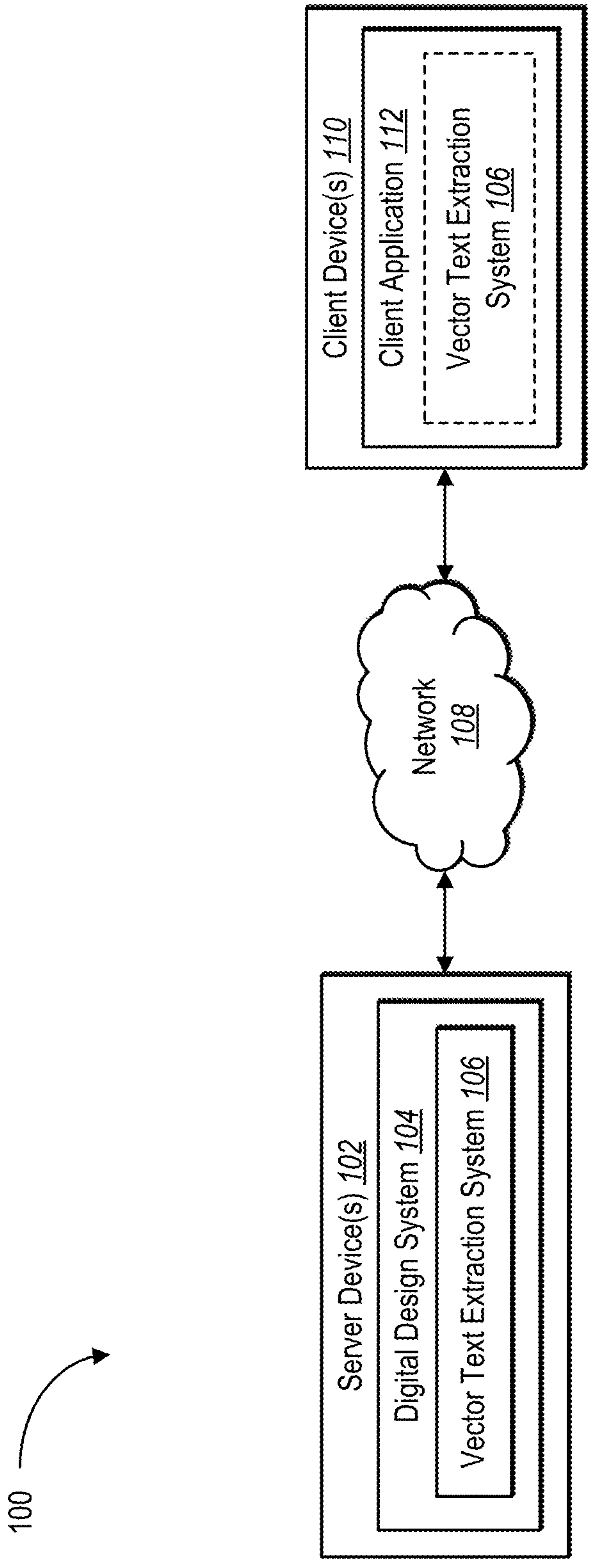
FIG. 1 illustrates a schematic diagram of an example environment of a vector text extraction system in accordance with one or more embodiments.

This disclosure describes one or more embodiments of a vector text extraction system that extract vector text from vector images using a multistep approach that includes content analysis, candidate outline filtering, and conditional candidate outline pruning. As part of the multistep approach, in one or more embodiments, the vector text extraction system performs content analysis by utilizing an optical character recognition (OCR) model to identify and extract textual content from within vector images. In certain embodiments, the OCR model further generates bounding boxes corresponding to the textual content. In addition, in some cases, the vector text extraction system performs candidate outline filtering to determine a set of intersecting vector paths that overlap the bounding boxes corresponding to the textual content. In one or more embodiments, the vector text extraction system performs conditional candidate outline pruning to refine the selected vector paths by employing various constraints to the set of intersecting paths to determine a set of text vector paths that outlines the textual content. By employing specific constraints, in some cases, the vector text extraction system isolates the vector paths that accurately outline the textual content, thereby eliminating extraneous noise or background paths from the selected vector paths. Furthermore, in certain embodiments, the vector text extraction system enables the automatic selection of the text vector paths with minimal user device interaction, allowing user devices to efficiently select and manipulate textual content for use in downstream processes, such as editing, formatting, or converting text in vector images.

As just mentioned, in one or more embodiments, the vector text extraction system identifies and extracts textual content from within vector images utilizing an OCR model. For example, the vector text extraction system identifies and extracts textual content corresponding to characters and text sequences within the vector image. In one or more embodiments, in conjunction with extracting textual content the vector text extraction system determines bounding boxes associated with each detected text region. The vector text extraction system also determines or defines dimensions and coordinate locations for the bounding boxes, indicating pixel locations for edges of the bounding boxes.

In certain embodiments, the vector text extraction system determines intersecting vector paths that intersect with the bounding box. For example, the vector text extraction system determines vector paths that overlap or intersect with a bounding box identified via the OCR model. To determine the intersecting vector paths, the vector text extraction system identifies all vector paths in a vector image and organizes the vector paths into a sorted data structure by sorting according to coordinate locations (e.g., pixel locations) of the vector paths. In one or more embodiments, by searching the data structure for vector paths with one or more edges positioned within the bounding box, the vector text extraction system determines the intersecting vector paths.

As mentioned, in one or more embodiments, the vector text extraction system employs various constraints to filter or prune the intersecting vector paths and determine text vector paths defining textual content. In one or more embodiments, the vector text extraction system uses one or more of a background constraint, a coverage constraint (or a noise constraint), a path overlap constraint, or a content aware constraint. For example, the vector text extraction system utilizes the background constraint to filter vector paths with area larger than the bounding box. In some cases, the vector text extraction system utilizes the coverage constraint to filter vector paths with a coverage area larger than a maximum character area or less than a minimum character area. In one or more embodiments, the vector text extraction system utilizes the path overlap constraint to filter vector paths where the overlapping area of the vector path is less than a threshold amount of the entire vector path. In certain embodiments, the vector text extraction system utilizes the content aware constraint to filter vector paths by comparing characteristics of the vector paths to characteristics from content metadata of character vectors (e.g., visual heuristics such as spacing, font, size, and position of characters).

As described above, the vector text extraction system overcomes shortcomings of conventional systems that provide tools for vectorizing raster images. Specifically, conventional systems have a number of technical shortcomings with regard to flexibility, accuracy, and operational efficiency when extracting vector paths corresponding to outlined textual content within vector images. For example, many existing design systems lack the flexibility and capability to effectively identify, select, clean, or manipulate vectorized textual content. Indeed, due to the complexity of distinguishing vector text from other vector content, existing design systems provide a limited set of tools to convert text outlines into editable text. Many of the tools in existing systems are interaction-based and rigidly reliant on cursor locations for selecting individual vector paths. This rigidity prevents existing design systems from distinguishing between vector text and other vector content, instead selecting vector paths based on cursor locations, irrespective of whether the selected vector paths actually depict vector text or depict some other vector content.

Relatedly, the vector path selection process of existing design systems is operationally inefficient. Indeed, as indicated above, many existing design systems rely on interaction-driven vector selection to individually select each vector path or segment. The selection process of existing design systems is particularly cumbersome when dealing with intricate designs or large numbers of vector elements (text or otherwise). Furthermore, because existing design systems cannot accurately distinguish between text and non-text vector paths, such systems often require additional cleaning processes to remove extraneous elements incorrectly selected as vector text. To illustrate, the selection tools of existing design systems often lead to inaccurate selections (e.g., missing parts of letters, inclusion of extraneous background) which require additional cleaning steps to correct for isolating vector text. Existing systems are thus inefficient for requiring such additional cleaning steps in addition to the excessive numbers of interactions for individual vector path selection, altogether resulting in numbers of interactions that could be reduced with a more efficient system.

As just indicated, many existing design systems are prone to inaccuracies. For example, even in systems that attempt to identify and outline vector paths in an image, such systems inaccurately differentiate (or are entirely incapable of differentiating) between vector paths that define text content from those that define non-text content, especially in complex overlapping vector layouts. Indeed, existing systems often extract vector paths from vector images but confuse vector paths depicting non-text content with vector paths depicting text content (or vice-versa). In many cases, such confusion demands that existing systems perform additional cleanup processes to indicate text vectors and/or non-text vectors on a path-by-path basis via client device interaction, as mentioned above.

As suggested above, embodiments of the vector text extraction system provide a variety of advantages over existing design systems. For example, one or more embodiments of the vector text extraction system improve flexibility in comparison to conventional design systems. Unlike existing systems that use a fixed set of text extraction tools which rely on cursor location to individually select vector paths, the vector text extraction system flexibly adapts a vector text extraction process to a wide array of vector images. For example, the vector text extraction system selects a set of vector paths outlining the textual content within the vector image while ignoring or omitting vector paths depicting non-text content. Indeed, the vector text extraction system performs content analysis, candidate outline filtering, and conditional candidate outline pruning which are adaptable to individual vector images, extracting text vectors while omitting non-text vectors.

Relatedly, in some embodiments, the selection process of existing design systems provides improved operationally efficiency relative to existing design systems. For example, unlike many existing design systems that rely on excessive device interactions and additional cleaning processes to distinguish between text and non-text vector paths, the vector text extraction system selects textual content based on few user device interactions (e.g., a single click). Indeed, the vector text extraction system provides editable text (e.g., live text) that is correctly outlined and isolated from the other vector paths within the vector image with as few as a single interaction with a client device. Indeed, in response to a single interaction, the vector text extraction system performs content analysis, candidate outline filtering, and conditional candidate outline pruning to determine vector text from a vector image. The vector text extraction system thus greatly reduces the number of interactions compared to prior systems that required excessive numbers of device inputs to identify text vector paths.

In addition, in one or more embodiments, the vector text extraction system improves the accuracy of vector text extraction within a vector image. For example, in contrast to many existing design systems that cannot accurately distinguish between text and non-text vector paths, the vector text extraction system uses sophisticated candidate outline filtering and outline pruning constraints to extract text vector paths. For example, the vector text extraction system implements a background constraint, a coverage constraint (or a noise constraint), a path overlap constraint, and/or a content aware constraint to accurately filter among extracted vector paths to differentiate between paths depicting text content and paths depicting non-text content. Thus, the vector text extraction system identifies and extracts text vector paths that are highly accurate and without missed (e.g. text vector paths) or extra elements (e.g., additional or background vector paths).

Additional detail regarding the vector text extraction system will now be provided with reference to the figures. For example, FIG. 1 illustrates a schematic diagram of an exemplary system environment ("environment") 100 in which a vector text extraction system 106 operates. As illustrated in FIG. 1, the environment 100 includes server device(s) 102, a network 108, and client device(s) 110.

Although the environment 100 of FIG. 1 is depicted as having a particular number of components, the environment 100 is capable of having any number of additional or alternative components (e.g., any number of servers, client devices, or other components in communication with the vector text extraction system 106 via the network 108). Similarly, although FIG. 1 illustrates a particular arrangement of the server device(s) 102, the network 108, and client device(s) 110, various additional arrangements are possible.

The server device(s) 102, the network 108, and client device(s) 110 are communicatively coupled with each other either directly or indirectly (e.g., through the network 108 discussed in greater detail below in relation to FIG. 9). Moreover, the server device(s) 102 and client device(s) 110 include one of a variety of computing devices (including one or more computing devices as discussed in greater detail with relation to FIG. 9).

As illustrated in FIG. 1, the environment 100 includes the server device(s) 102 and digital design system 104. The server device(s) 102 utilizes the digital design system 104 to generate, track, store, process, receive, and transmit electronic data including images and vector paths. For example, the server device(s) 102 receives or monitors interactions across the client device(s) 110. In some embodiments, the server device(s) 102 transmits content to the client device(s) 110 to cause the client device(s) 110 to display content associated with selecting text vector paths. For example, the server device(s) 102 presents an image and/or set of text vector paths to client device(s) 110 and displays an image and/or set of text vector paths on the client device(s) 110 with the image and/or set of text vector paths displayed corresponding to system need (e.g., provide a set of text vector paths for display via client application(s) 112).

Additionally, the server device(s) 102 includes all, or a portion of, the vector text extraction system 106. For example, the vector text extraction system 106 operates on the server device(s) 102 to access digital content (including images and vector paths), determine digital content changes, and provide localization of content changes to the client device(s) 110. In one or more embodiments, via the server device(s) 102, the vector text extraction system 106 generates and displays images and/or vector paths based on the client device(s) 110 input. Example components of the vector text extraction system 106 will be described below with regard to FIG. 9.

Furthermore, as shown in FIG. 1, the illustrated system includes the client device(s) 110. In some embodiments, the client device(s) 110 include, but are not limited to, mobile devices (e.g., smartphones, tablets), laptop computers, desktop computers, or another type of computing devices, including those explained below in reference to FIG. 9. Some embodiments of client device(s) 110 are operated by a user to perform a variety of functions via respective client application(s) 112 such as the identification and extraction of vector paths. The client device(s) 110 include one or more applications (e.g., the client application(s) 112) that access, edit, modify, store, and/or provide, for display, digital image content. For example, in some embodiments, the client application(s) 112 include a software application installed on the client device(s) 110. In other cases, however, the client application(s) 112 include a web browser or other application that accesses a software application hosted on the server device(s) 102.

In one or more embodiments, the vector text extraction system 106 is implemented in whole, or in part, by the individual elements of the environment 100. Indeed, as shown in FIG. 1, the vector text extraction system 106 is implemented with regard to the server device(s) 102 and the client device(s) 110. In particular embodiments, the vector text extraction system 106 on the client device(s) 110 comprises a web application, a native application installed on the client device(s) 110 (e.g., a mobile application, a desktop application, a plug-in application, etc.), or a cloud-based application where part of the functionality is performed by the server device(s) 102.

In additional or alternative embodiments, the vector text extraction system 106 on the client device(s) 110 represents and/or provides the same or similar functionality as described herein in connection with the vector text extraction system 106 on the server device(s) 102. In some embodiments, the vector text extraction system 106 on the server device(s) 102 supports the vector text extraction system 106 on the client device(s) 110.

In some embodiments, the vector text extraction system 106 includes a web hosting application that allows the client device(s) 110 to interact with content and services hosted on the server device(s) 102. To illustrate, in one or more embodiments, the client device(s) 110 accesses a web page or computing application supported by the server device(s) 102. The client device(s) 110 provides input to the server device(s) 102 (e.g., selected textual content). In response, the vector text extraction system 106 on the server device(s) 102 identifies/extracts digital content. The server device(s) 102 then provides the digital content to the client device(s) 110.

In another implementation, the vector text extraction system 106 on the server device(s) 102 supports the vector text extraction system 106 on the client device(s) 110. For instance, in some cases, the vector text extraction system 106 on the server device(s) 102 generates or learns parameters for one or more machine learning models (e.g., an OCR model). The vector text extraction system 106 then, via the server device(s) 102, provides the one or more trained machine learning models to the client device(s) 110. In other words, the client device(s) 110 obtains (e.g., downloads) the one or more machine learning models (e.g., with any learned parameters) from the server device(s) 102. Once downloaded, the one or more machine learning models on the client device(s) 110 utilizes the one or more trained machine learning models to generate outlines independent from the server device(s) 102.

In some embodiments, though not illustrated in FIG. 1, the environment 100 has a different arrangement of components and/or has a different number or set of components altogether. For example, in certain embodiments, the client device(s) 110 communicate directly with the server device(s) 102, bypassing the network 108. As another example, the environment 100 includes a third-party server comprising a content server and/or a data collection server.

Figure 2:
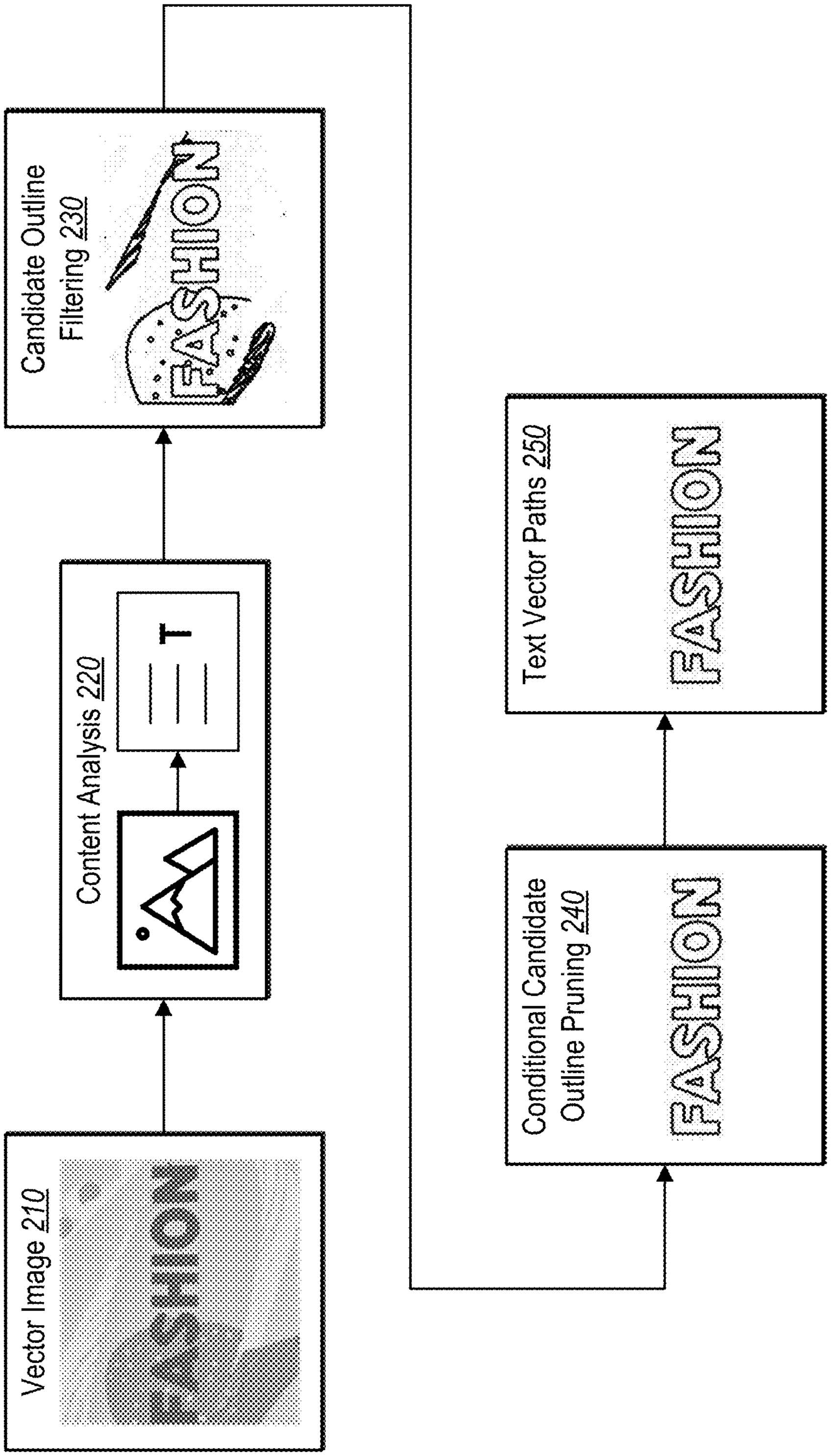
FIG. 2 illustrates an example overview of extracting text vector paths from within a vector image in accordance with one or more embodiments.

As previously mentioned, in one or more embodiments, the vector text extraction system 106 extracts vector text from vector images using a multistep approach that includes content analysis, candidate outline filtering, and conditional candidate outline pruning. For instance, FIG. 2 illustrates an example overview of extracting text vector paths from within a vector image utilizing a multistep approach in accordance with one or more embodiments. Additional detail regarding the various acts of FIG. 2 is provided thereafter with reference to subsequent figures.

As shown in FIG. 2, the vector text extraction system 106 generates text vector paths 250 based on a vector image 210 utilizing the disclosed methods. In particular, in one or more embodiments, the vector text extraction system 106 receives or determines the vector image 210 (e.g., through a client device interaction). For example, the vector image 210 includes an image made up of vector paths which form various shapes, such as text, objects, background, and illustrations. As shown, the vector image 210 contains one or more identifiable characters represented using vector paths that outline each character. As also shown, the vector image 210 contains one or more additional non-textual elements such as a background or additional shapes within the image. For example, the vector image 210 contains overlapping vector paths which add depth and context.

As further shown, in one or more embodiments, the vector text extraction system 106 performs content analysis 220 to determine textual content within the vector image 210. In particular, the vector text extraction system 106 processes the vector image 210 to recognize probable regions within the vector image 210 which contain textual content. For example, the vector text extraction system 106 processes the vector image 210 to recognize textual content within the vector image 210 which includes words, characters, and/or phrases. In addition, the vector text extraction system 106 determines a bounding box that encloses the textual content. In one or more embodiments, the vector text extraction system 106 generates a list of textual content, bounding boxes, and/or words defined by the textual content (e.g., individual words).

As further shown, the vector text extraction system 106 performs candidate outline filtering 230 to extract or identify vector paths that overlap or intersect with one or more bounding boxes surrounding text. In this fashion, the vector text extraction system 106 utilizes the candidate outline filtering 230 to extract a set of vector paths in proximity to the textual content identified by the content analysis 220. In some cases, the vector text extraction system 106 extracts the vector paths vector paths that intersect with the bounding boxes that enclose the textual content. Furthermore, the vector text extraction system 106 identifies the vector paths that intersect with the bounding boxes by checking if segments of the vector paths (e.g., left edge, right edge, top edge, bottom edge) lie within the bounding boxes. In certain embodiments, the vector text extraction system 106 filters the vector paths to retain the vector paths which intersect with the bounding boxes.

Furthermore, in certain embodiments, the vector text extraction system 106 performs conditional candidate outline pruning 240 to distinguish between text vector paths (e.g., vector outlines) and non-textual vector paths. For example, a vector path includes or refers to a series of points defined by mathematical equations that create lines, curves and shapes (e.g., made up of anchor points and/or control points of a Bezier spline or curve). In some cases, vector paths include key points that define the start, end, and points of change along the path. In some cases, the vector paths include segments that connect the anchor points. Relatedly, a text vector paths includes or refers to a vector path that outlines textual content within a vector image. In some cases, the text vector paths 250 define the textual content utilizing a series of points, lines, and curves that represent the shape of textual content.

In particular, the vector text extraction system 106 performs conditional candidate outline pruning 240 to refine the selected vector paths (from the candidate outline filtering 230) and retain the text vector paths that outline the textual content. To illustrate, the vector text extraction system 106 utilizes various constraints to filter the vector paths by removing those vector paths that fail to satisfy one or more pruning constraints. In one or more embodiments, the vector text extraction system 106 utilizes: i) a background constraint to filter vector paths with area larger than the bounding box, ii) a coverage constraint to filter vector paths with a coverage area larger than a maximum character area or less than a minimum character area, iii) a path overlap constraint to filter vector paths where the overlapping area of the vector path is less than a threshold amount of the entire vector path, and/or iv) a content aware constraint to filter vector paths by comparing characteristics of the vector paths to characteristics from content metadata of character vectors.

As further shown, the vector text extraction system 106 determines the text vector paths 250. In particular, the vector text extraction system 106 identifies or extracts the text vector paths 250 that satisfy the constraints of the conditional candidate outline pruning 240. To illustrate, the vector text extraction system 106 retains the vector paths that satisfy the background constraint, the coverage constraint, the path overlap constraint, and/or the content aware constraint as the text vector paths 250.

Figure 3:
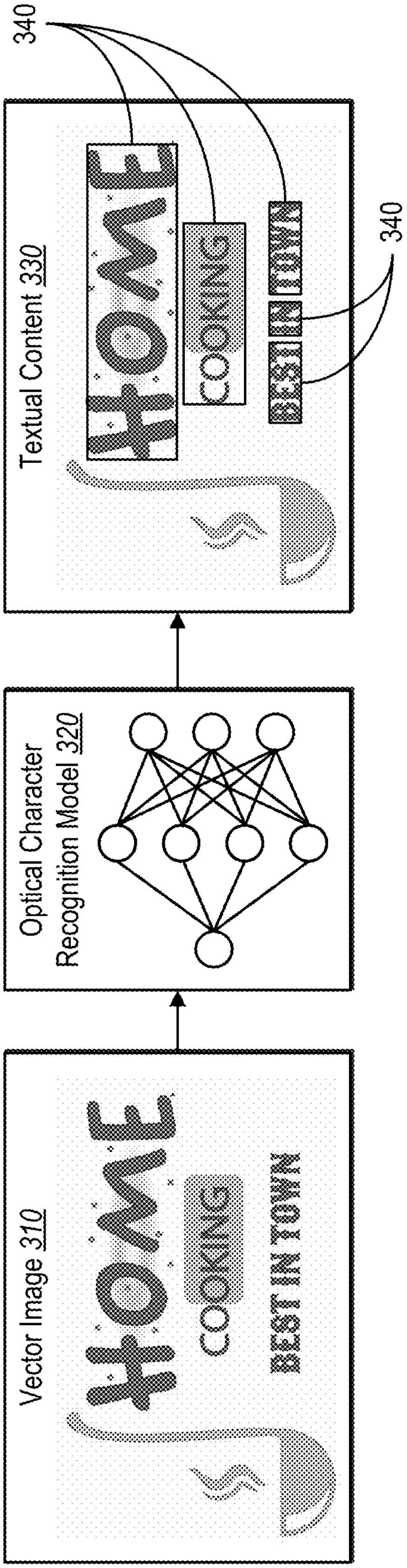
FIG. 3 illustrates an example of extracting textual content from a vector image utilizing an optical character recognition model in accordance with one or more embodiments.

As mentioned, the vector text extraction system 106 utilizes an optical character recognition model to identify textual content and corresponding bounding boxes within a vector image. FIG. 3 illustrates an example of extracting textual content from a vector image utilizing an optical character recognition model (OCR Model) in accordance with one or more embodiments.

As shown in FIG. 3, the vector text extraction system 106 utilizes an OCR model 320 to identify textual content 330 within the vector image 310. In certain embodiments, the vector text extraction system 106 utilizes the OCR model 320 (e.g., a deep neural network OCR model) to extract features, identify textual context, and classify textual content from the vector image 310. In one or more embodiments, the OCR model 320 is a machine learning model (e.g., a neural network) or a collection of machine learning models designed for semantic segmentation tasks (e.g., partitioning an image into multiple segments).

For example, the OCR model 320 identifies potential textual content within vector images. In some cases, the OCR model 320 identifies areas or regions where text paths are located, using edge detection and/or segmentation methods. In some implementations, the OCR model 320 analyzes the shapes and contours of the vector paths compared with stored character metadata (e.g., points, lines, paths) to analyze the vector paths.

In one or more embodiments, the OCR model 320 processes each proposed text region to recognize individual characters and words corresponding to textual content outlined by the vector paths. In some cases, the OCR model 320 utilizes machine learning techniques (e.g., deep learning models) to classify and recognize individual characters from the vector outlines. For example, the OCR model 320 applies character recognition algorithms (e.g., curve fitting and/or path tracing) to map the vector outlines to text characters. In one or more embodiments, the vector text extraction system 106 trains the OCR model 320 on a large dataset of vectorized text to learn the nuances of different fonts and styles, enabling the OCR model 320 to accurately interpret the vector outlines. Furthermore, in some cases, the OCR model 320 incorporates language models to improve text recognition accuracy by considering contextual information.

Furthermore, in one or more embodiments, the OCR model 320 determines bounding boxes 340 corresponding to the textual content. For example, for each detected word, character, and/or phrase the OCR system calculates a bounding box. In some cases, the bounding boxes 340 are defined by position coordinates (x, y) of a corner and size dimensions (width, height) of the bounding boxes 340 (to define edges in relation to the corner) that enclose the textual content. In one or more embodiments, the OCR model 320 associates the bounding boxes with the corresponding textual content and generates a listing of the associated textual content, bounding boxes, and words.

As further shown in FIG. 3, the OCR model 320 provides the textual content 330. For example, the OCR model 320 provides the bounding boxes 340 associated with the textual content within the vector image 310. In some cases, the OCR model 320 generates a list of textual content including word textual content (e.g., string of characters) and bounding boxes (e.g., coordinates, size, position).

Figure 4:
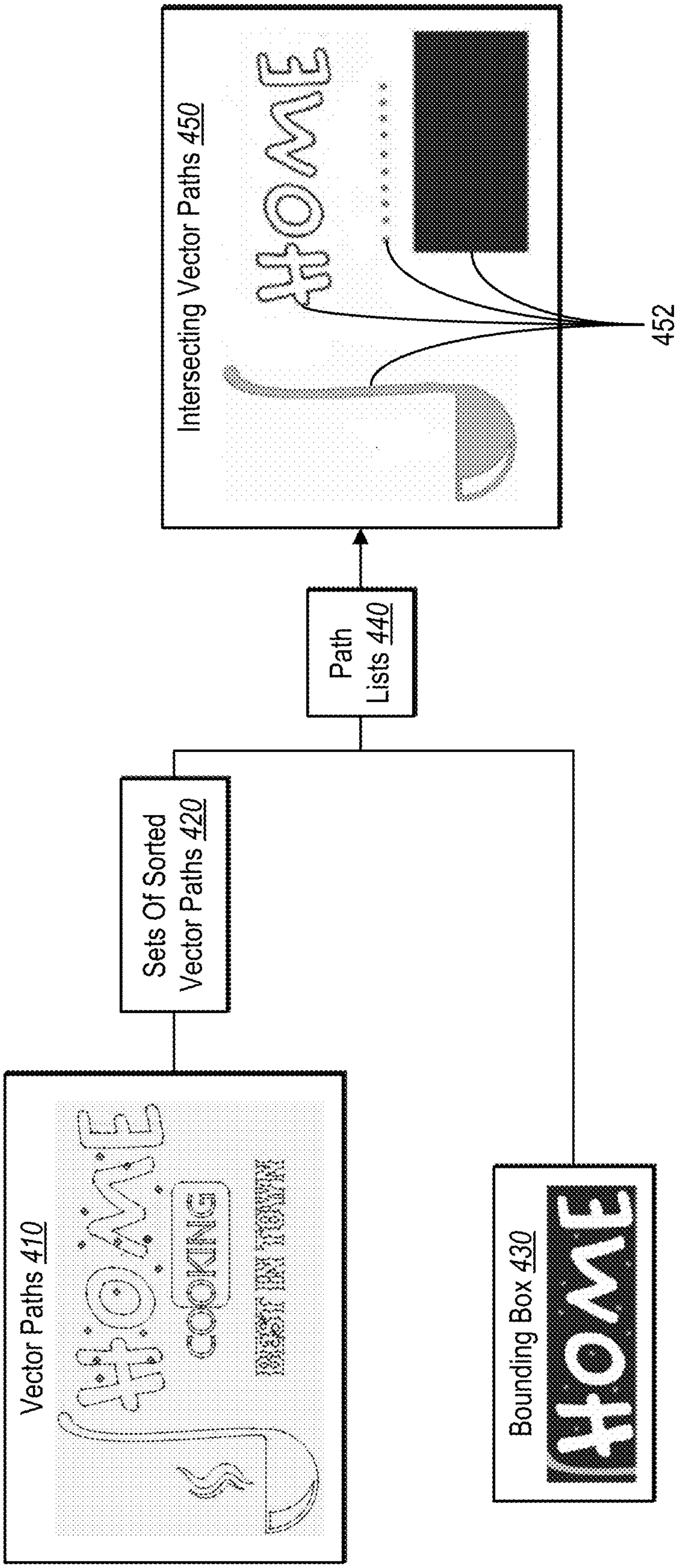
FIG. 4 illustrates an example of determining intersecting vector paths for a bounding box within a vector image in accordance with one or more embodiments.

As mentioned, the vector text extraction system utilizes candidate outline filtering to extract the text vector paths from among vector paths that intersect with the bounding boxes. FIG. 4 illustrates an example of determining intersecting vector paths for a bounding box within a vector image in accordance with one or more embodiments. For example, an intersecting vector path includes or refers to a vector path that overlaps or intersects with a bounding box identified via the OCR model 320.

For example, the vector text extraction system 106 organizes the vector paths 410 of the vector image. In particular, the vector text extraction system 106 receives or determines the vector paths 410 corresponding to the vector paths within a vector image. For example, the vector text extraction system 106 parses the vector image to extract the vector path data.

In one or more embodiments, the vector text extraction system 106 utilizes a data structure to organize the vector paths 410 by sorting the vector paths 410. For example, the vector text extraction system 106 generates the data structure by sorting the vector paths according to the position of the vector paths within the vector image. In some cases, the vector text extraction system 106 utilizes the data structure for all the textual content within the vector image.

To illustrate, as shown in FIG. 4, the vector text extraction system 106 generates the data structure to include the sets of sorted vector paths 420. In particular, the vector text extraction system 106 generates the data structure from the sets of sorted vector paths 420 by sorting the vector paths 410 outlining all vector content in the vector image. In one or more embodiments, the vector text extraction system 106 sorts the vector paths 410 within the vector image into the sets of sorted vector paths 420 by sorting the vector paths 410 in multiple directions. For example, the vector text extraction system 106 sorts the vector paths 410 into sets of sorted vector paths 420 including: 1) a first set sorted by the left edges of the vector paths 410 in a horizontal direction (e.g., where paths are ordered from left-to-right or right-to-left based on left edge locations), 2) a second set sorted by the right edges of the vector paths 410 in a horizontal direction (e.g., where paths are ordered left-to-right or right-to-left based on right edge locations), 3) a third set sorted by the top edges of the vector paths 410 in a vertical direction (e.g., where paths are ordered top-to-bottom or bottom-to-top based on top edge locations), and 4) a fourth set sorted by the bottom edges of the vector paths 410 in a vertical direction (e.g., where paths are ordered top-to-bottom or bottom-to-top based on bottom edge locations).

Furthermore, the vector text extraction system 106 identifies the vector paths 410 that intersect with bounding box 430. For example, the vector text extraction system 106 searches the sets of sorted vector paths 420 within the data structure to determine if segments of the vector paths 410 lie within the boundaries of the bounding box 430. In certain embodiments, the vector text extraction system 106 filters the vector paths 410 to retain the vector paths 410 which intersect with the bounding box 430 (e.g., intersecting vector paths 450).

In some cases, the vector text extraction system 106 utilizes path lists 440 to identify the vector paths 410 that intersect with the bounding box 430. For example, the path lists 440 include or refer to a subset of the vector paths 410 within the vector image that intersect with the bounding box 430. In particular, the vector text extraction system 106 performs a binary search of the sets of sorted vector paths 420 to determine the path lists 440 by determining which of the vector paths 410 intersect with the bounding box 430. In one or more embodiments, the path lists 440 include or refer to vector paths with a left, right, top, or bottom edge that lies within the span of the bounding box 430.

To illustrate, the vector text extraction system 106 performs a binary search for each of the vector paths 410 to determine vector paths 410 which lie within the bounding box 430. For example, the vector text extraction system 106 performs a binary search within the first set to determine vector paths whose left edge lies between the horizontal span of the bounding box 430 (e.g., within the horizontal coordinates). Similarly, in one or more embodiments, the vector text extraction system 106 performs a binary search of the vector paths within the second set to determine vector paths whose right edge lies between the horizontal span of the bounding box 430. Furthermore, in one or more embodiments, the vector text extraction system 106 performs a binary search of the vector paths within the third set to determine vector paths whose top edge lies between the vertical span of the bounding box 430. Moreover, in one or more embodiments, the vector text extraction system 106 performs a binary search of the vector paths within the fourth set to determine vector paths whose bottom edge lies between the vertical span of the bounding box 430.

The vector text extraction system 106 thus generates four path lists, one from each of the four sets. Furthermore, the vector text extraction system 106 determines a union of the path lists 440 (e.g., a union of the first list, second list, third list, and fourth list) and extracts the intersecting vector paths 450 from the path lists 440. As shown, the intersecting vector paths 450 include the vector paths 452, all of which intersect with the bounding box 430.

In particular, the vector text extraction system 106 extracts and retains the vector paths that intersect with the bounding box 430 that encloses the textual content (e.g., "HOME") of the vector image as the intersecting vector paths 450. In one or more embodiments, the vector text extraction system 106 utilizes the following algorithm to determine the intersecting vector paths 450:

```
Algorithm 1 Intersecting Vector Path Filtering
Require: PathBounds, WordBounds

procedure INTERSECTING VECTOR PATH FILTERING(PathBounds, WordBounds)
   use binary search to sort vector paths in selection in 4 different directions
   Create 4 sets of sorted vector paths
   Horiz-Left-SortedSet = All vector paths sorted by left edge in horizontal direction
   Horiz-Right-SortedSet = All vector paths sorted by right edge in horizontal direction
   Vert-Top-SortedSet = All vector paths sorted by top edge in vertical direction
   Vert-Bottom-SortedSet = All vector paths sorted by bottom edge in vertical direction
Create 4 path lists
   List1 = Binary search all vector paths in Horiz-Left-SortedSet whose left edge lies in
between bounding box horizontal Span (WordLeft, WordRight)
   List2 = Binary search all vector paths in Horiz-Right-SortedSet whose Right edge lies
in between bounding box horizontal Span (WordLeft, WordRight)
   List3 = Binary search all vector paths in Vert-Top-SortedSet whose top edge lies in
between bounding box vertical Span (WordTop, WordBottom)
   List4 = Binary search all vector paths in Vert-Bottom-SortedSet whose bottom edge
lies in between bounding box vertical Span (WordTop, WordBottom)
   Intersecting Path List = Union of all the lists filtered above: List1 + List2 + List3 +
List 4
```

As shown, the vector text extraction system 106 extracts and retains the vector paths that intersect with the bounding box 430 as the intersecting vector paths 450 (e.g., Intersecting Path List).

As mentioned, the vector text extraction system 106 utilizes various constraints to perform conditional candidate outline pruning the intersecting vector paths and determine the text vector paths. FIGS. 5A-5F illustrate examples of extracting textual content from a set of intersecting vector paths utilizing conditional candidate outline pruning with various constraints in accordance with one or more embodiments.

As mentioned above and shown in FIG. 5A, in one or more embodiments the vector text extraction system 106 utilizes the constraints 520 to filter intersecting vector paths 510*a*. In particular, the vector text extraction system 106 filters the intersecting vector paths 510*a* by removing the intersecting vector paths 510*a* that fail to satisfy the constraints 520. In one or more embodiments, the vector text extraction system 106 utilizes a background constraint 530, a coverage constraint 540 (e.g., a maximum coverage constraint 554 and/or a minimum coverage constraint 564), a path overlap constraint 576, and/or a content aware constraint 580 to filter the intersecting vector paths 510*a*.

Figure 5A:
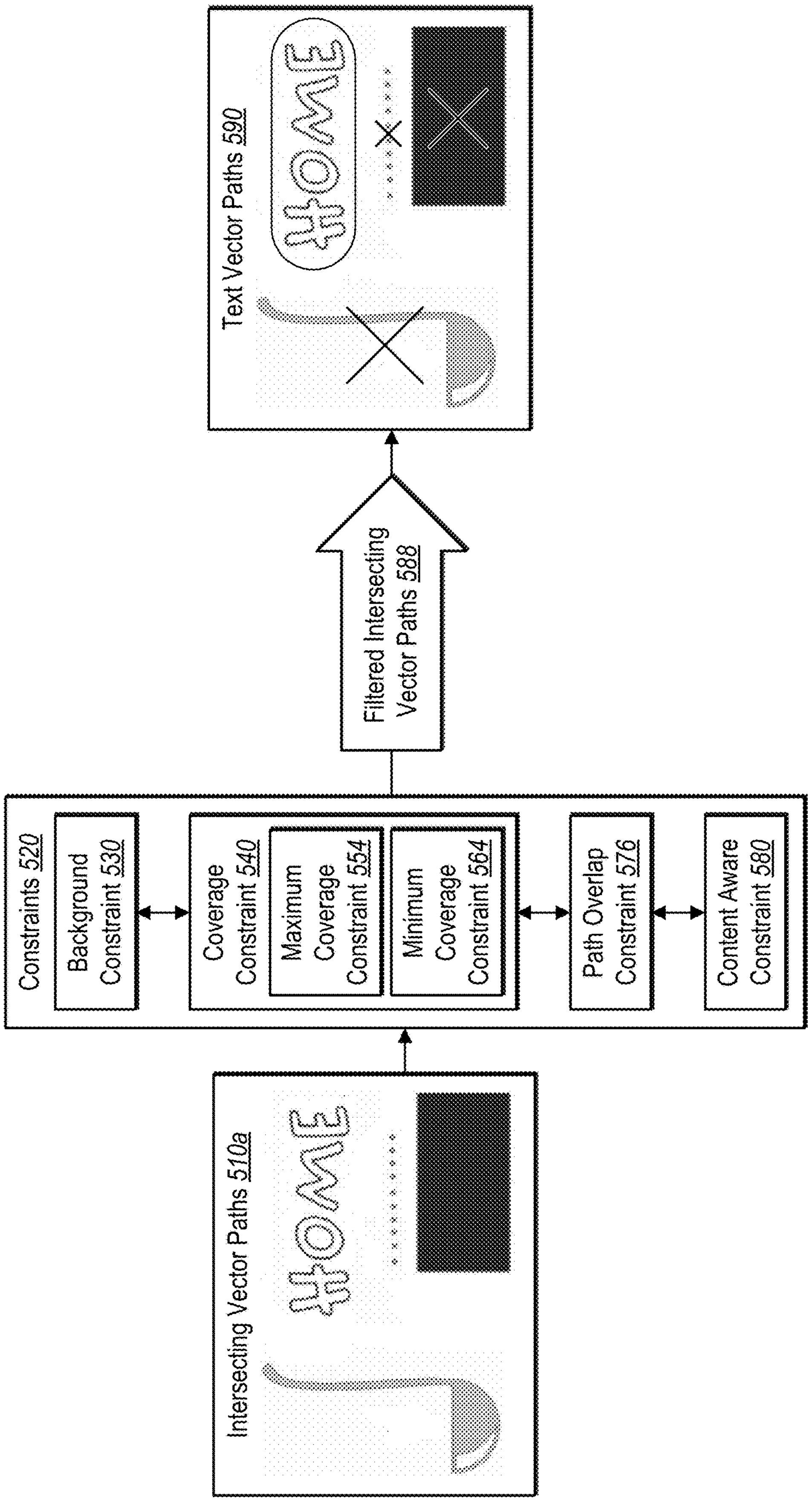
FIG. 5A illustrates an example of extracting textual content from a set of intersecting vector paths utilizing conditional candidate outline pruning in accordance with one or more embodiments.

As further shown in FIG. 5A, the vector text extraction system 106 determines successful candidate vector paths that satisfy a combination the constraints 520 to determine the text vector paths 590. In particular, the vector text extraction system 106 prunes the intersecting vector paths 510*a* to remove the intersecting vector paths 510*a* that do not satisfy the constraints 520 (e.g., and which therefore define non-textual elements) to determine the filtered intersecting vector paths 588. For example, the vector text extraction system 106 utilizes the constraints 520 (as described in more detail in relation to FIGS. 5B-5F) to obtain the filtered intersecting vector paths 588 (as represented by filtered intersecting vector paths 532, filtered intersecting vector paths 558, filtered intersecting vector paths 568, filtered intersecting vector paths 578, and/or filtered intersecting vector paths 584).

Notably, in one or more embodiments, the vector text extraction system 106 utilizes a combination of the constraints 520 to determine the text vector paths 590. For example, to determine the filtered intersecting vector paths 588, the vector text extraction system 106 applies a combination of one or more of the constraints 520. In certain embodiments, the vector text extraction system 106 applies the combination of the constraints 520 different sequential orders. In these embodiments, the vector text extraction system 106 determines the successful candidate vector paths that represent textual elements based on the text vector paths 590 that satisfy the combination of the constraints 520.

Figure 5B:
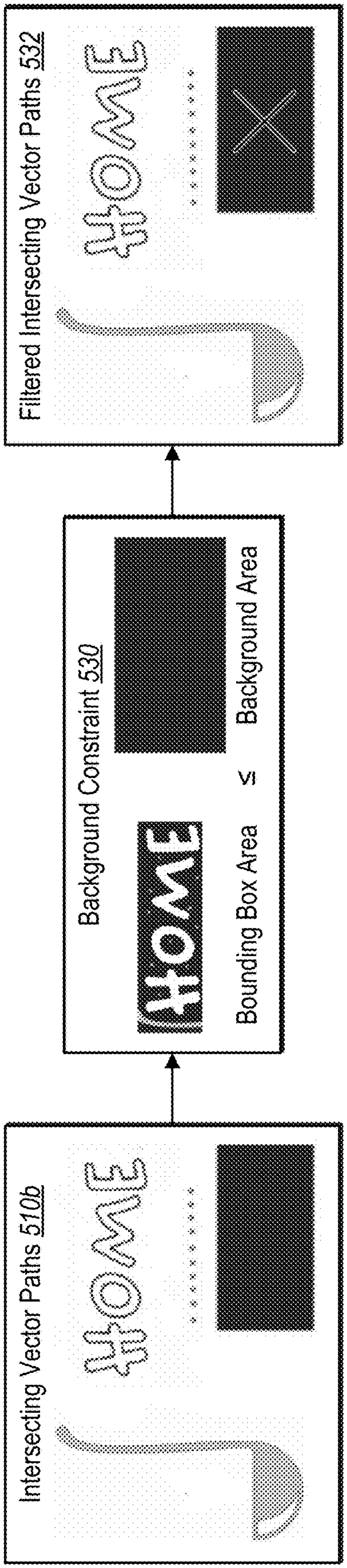
FIG. 5B illustrates an example of extracting textual content from a set of intersecting vector paths utilizing a background constraint in accordance with one or more embodiments.

As mentioned, in some cases, the vector text extraction system 106 utilizes a background constraint 530 to filter intersecting vector paths with an area larger than the bounding box. FIG. 5B illustrates an example of extracting textual content from intersecting vector paths 510*b* utilizing a background constraint 530 in accordance with one or more embodiments.

As shown in FIG. 5B, in one or more embodiments, the vector text extraction system 106 determines that the intersecting vector paths 510*b* include background vector paths. In particular, the vector text extraction system 106 determines that the intersecting vector paths 510*b* include vector paths with an area larger than the bounding box area (or larger by at least a threshold margin or amount). In one or more embodiments, the vector text extraction system 106 filters the intersecting vector paths 510*b* based on the background constraint 530 that includes comparing and removing the intersecting vector paths 510*b* with an area larger than the bounding box area. As shown, based on the background constraint, the vector text extraction system 106 filters the intersecting vector paths 510*b* to determine the filtered intersecting vector paths 532.

In one or more embodiments, the vector text extraction system 106 utilizes Algorithm 2 for the background constraint 530 to determine the filtered intersecting vector paths 532 as follows:

Algorithm 2 Background Constraint

Require: Path Area($P$), Bounding Box Area($A_w$)

procedure BACKGROUND CONSTRAINT($P$, $A_w$)
  if $P >= A_w$ then
    Discard vector path as background art
  else
    Accept vector path as Textual Content As shown, the vector text extraction system 106 utilizes Algorithm 2 to determines the background vector paths by comparing the areas of the intersecting vector paths 510*b* (e.g., (P)) with the bounding box area (e.g., $A_w$).

Figure 5C:
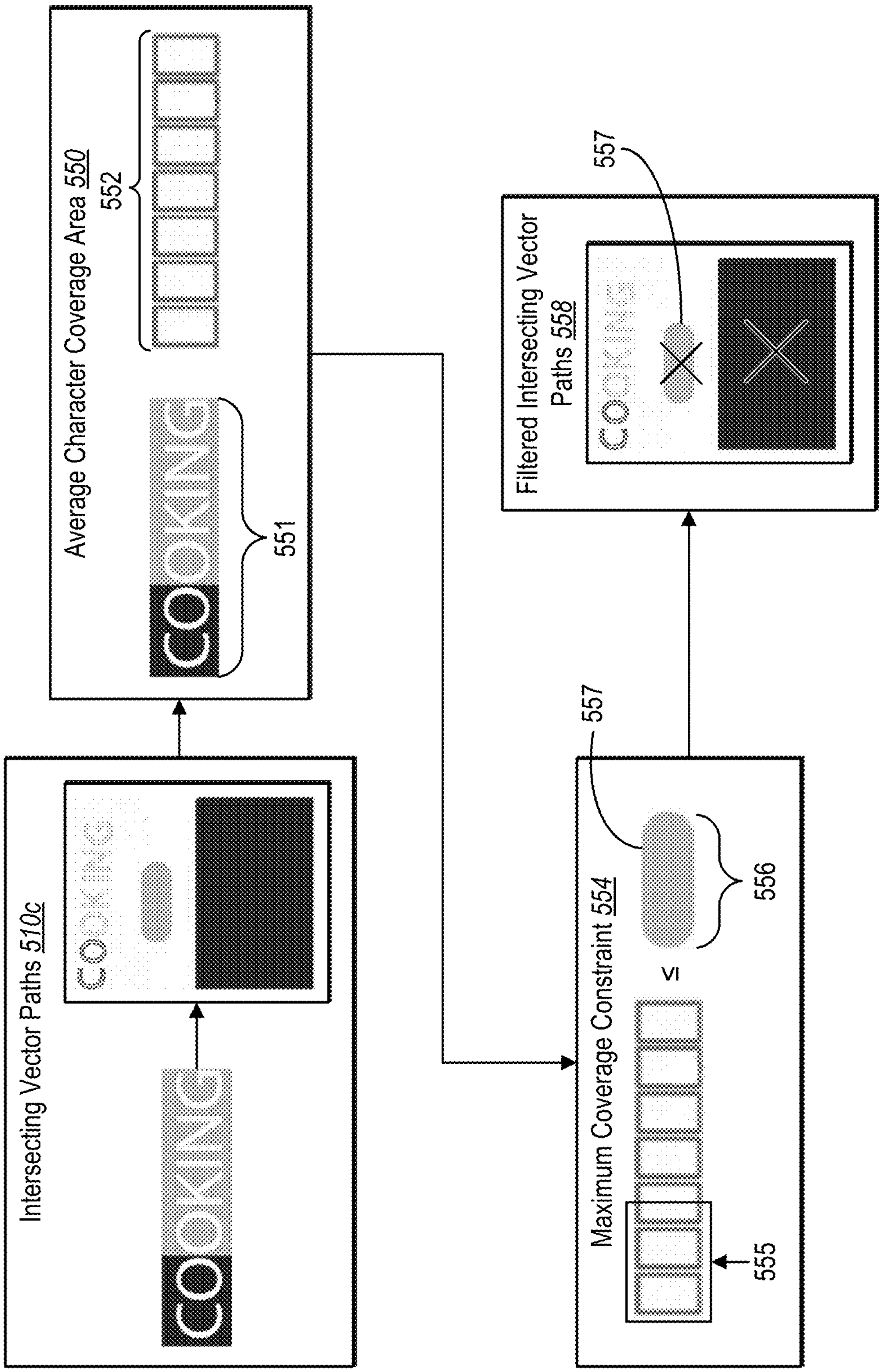
FIG. 5C illustrates an example of extracting textual content from a set of intersecting vector paths utilizing a maximum coverage constraint in accordance with one or more embodiments.

As mentioned, in some cases, the vector text extraction system 106 utilizes a maximum coverage constraint 554 to filter intersecting vector paths with a coverage area larger than a maximum character area. FIG. 5C illustrates an example of extracting textual content from the intersecting vector paths 510*c* utilizing the maximum coverage constraint 554 in accordance with one or more embodiments.

As shown in FIG. 5C, in one or more embodiments, the vector text extraction system 106 determines that the intersecting vector paths 510*c* include vector paths that cover an area greater than an area of characters within the textual content. In particular, the vector text extraction system 106 utilizes a maximum coverage constraint 554 to determine a maximum character coverage area 555 for a vector path to qualify as textual content. In one or more embodiments, the vector text extraction system 106 utilizes the maximum coverage constraint 554 to identify a vector path as textual content based on satisfying a threshold area for a character. For example, the vector text extraction system 106 determines the maximum character coverage area 555 which includes a threshold area that, when exceeded, identify a character as textual content.

In one or more embodiments, to apply the maximum coverage constraint 554, the vector text extraction system 106 determines an average character coverage area 550. In particular, the vector text extraction system 106 determines an average character coverage area 550 based on an approximate size of characters within the textual content. In some cases, the vector text extraction system 106 determines the average character coverage area 550 to be the bounding box area 551 divided by the total number of characters 552 in the textual content. To illustrate, for a bounding box area 551 of 700 square pixels for a word "COOKING," the vector text extraction system 106 assigns the average character coverage area 550 a value of 100 square pixels corresponding to the bounding box area 551 (e.g., 700 square pixels) divided by the total number of characters 552 (e.g., 7).

Furthermore, the vector text extraction system 106 utilizes the maximum character coverage area 555 to apply the maximum coverage constraint 554. In particular, the vector text extraction system 106 determines the maximum character coverage area 555 (e.g., threshold area) for a vector path to qualify as textual content based on a character maximum coverage factor and the average character coverage area 550. For example, the vector text extraction system 106 utilizes the character maximum coverage factor to calculate the maximum character coverage area 555 as a multiple of the average character coverage area 550 and the character maximum coverage factor. In one or more embodiments, the vector text extraction system 106 determines the character maximum coverage factor to be 2.5 (e.g., 2.5 times the average character coverage area 550).

To illustrate, the vector text extraction system 106 utilizes the maximum coverage constraint 554 to remove large vector paths unassociated with textual content, while still retaining the intersecting vector paths 510*c* associated with large textual content. For example, the vector text extraction system 106 compares the vector paths to the maximum character coverage area 555 (e.g., a maximum threshold area) to filter vector paths with an area larger than the area for a large character. In some cases, the vector text extraction system 106 utilizes the character maximum coverage factor to generate a maximum character coverage area 555 for textual content that includes a threshold large enough to retain vector paths outlining letters such as upper case or stylistic letters (e.g., letters that are larger than average by a multiple of the character maximum coverage factor).

As further shown in FIG. 5C, the vector text extraction system 106 generates the filtered intersecting vector paths 558 by applying the maximum coverage constraint 554 on the intersecting vector paths 510*c* to determine the filtered intersecting vector paths 558. For example, the vector text extraction system 106 utilizes the maximum coverage constraint 554 to compare the maximum character coverage area 555 to a vector path area 556 (e.g., area of vector path 557). In one or more embodiments, if the vector path area 556 is greater than or equal to the maximum character coverage area 555, the vector text extraction system 106 removes the vector path 557 to generate the filtered intersecting vector paths 558. As shown, the vector text extraction system 106 filters the intersecting vector paths 510*c* using the maximum coverage constraint 554 to generate the filtered intersecting vector paths 558.

In one or more embodiments, the vector text extraction system 106 utilizes the following algorithm for the maximum coverage constraint 554 to determine the filtered intersecting vector paths 558:

Algorithm 3 Maximum Coverage Constraint

Require: Path Area(P), Bounding Box Area($A_b$)
procedure MAXIMUM COVERAGE CONSTRAINT(P, $A_w$)
  N ← number of characters in the textual content extracted with OCR model
  th ← 2.5 character length
  f ← th ▷ f denotes Character Maximum Coverage Factor
  $A_{mx} \leftarrow \frac{A_b}{N} * f$ ▷ $A_{mx}$ denotes Maximum Character Coverage Area
  if P >= $A_{mx}$ then
    Discard vector path as noise
  else
    Accept vector path as Textual Content As shown in Algorithm 3, the vector text extraction system 106 retains the filtered intersecting vector paths 558 that satisfy the maximum character coverage area 555 (e.g., $A_{mx}$) by retaining the intersecting vector paths 510*c* (e.g., P) based on the character maximum coverage factor (e.g., th).

Figure 5D:
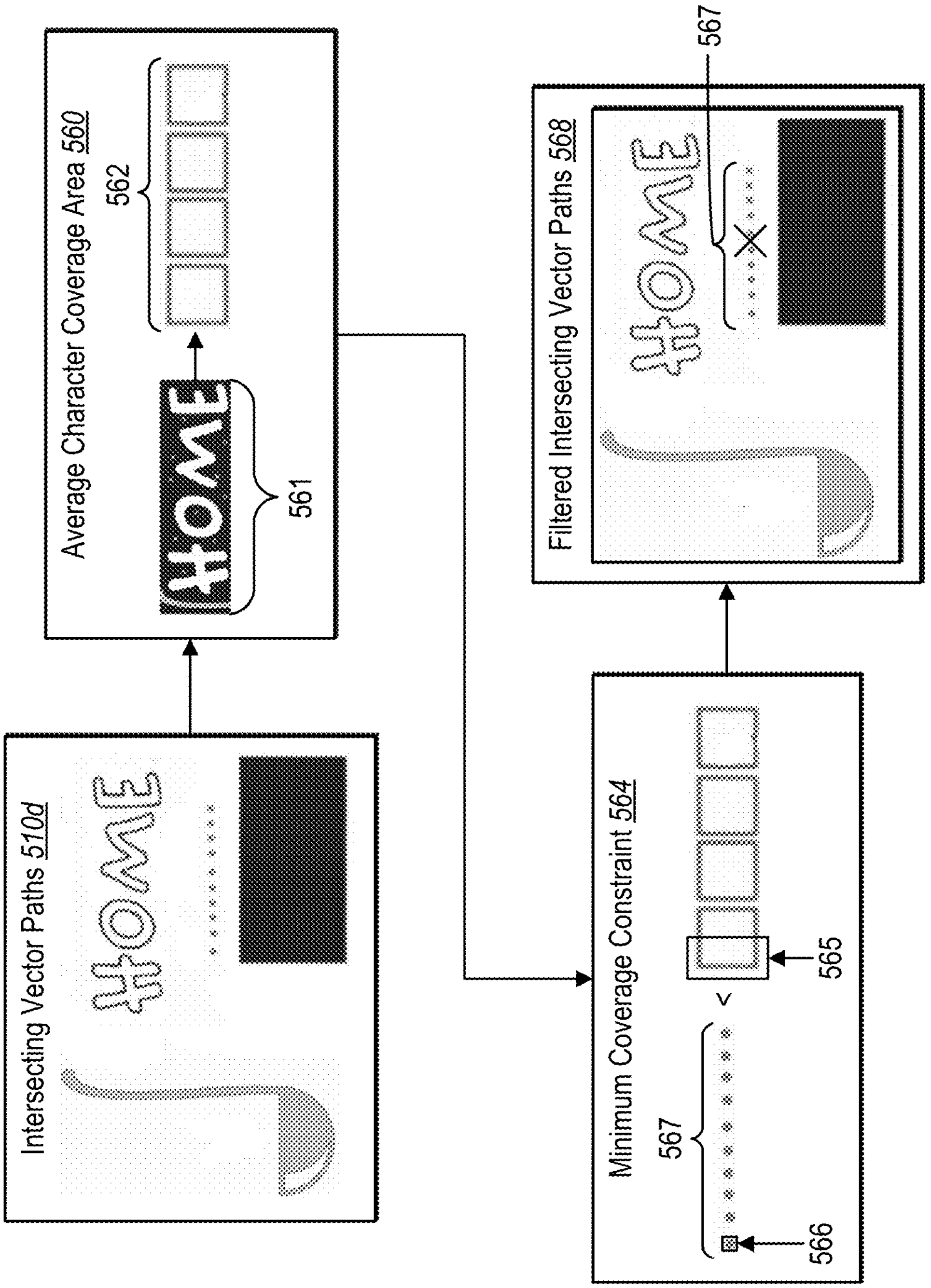
FIG. 5D illustrates an example of extracting textual content from a set of intersecting vector paths utilizing a minimum coverage constraint in accordance with one or more embodiments.

As mentioned, in some cases, the vector text extraction system 106 utilizes a minimum coverage constraint 564 to filter intersecting vector paths with a coverage area less than a minimum character area. FIG. 5D illustrates an example of extracting textual content from the intersecting vector paths 510*d* utilizing the minimum coverage constraint 564 in accordance with one or more embodiments. In one or more embodiments, the vector text extraction system 106 utilizes the minimum coverage constraint 564 to identify a vector path as textual content based on satisfying a threshold area for a character. For example, the vector text extraction system 106 determines a minimum character coverage area 565 which includes a threshold area that, when not met, identifies a character as textual content.

As shown in FIG. 5D, in one or more embodiments, the vector text extraction system 106 determines that the intersecting vector paths 510*d* include vector paths that cover an area less than the area covered by characters within the textual content. In particular, the vector text extraction system 106 utilizes a minimum coverage constraint 564 to determine a minimum character coverage area 565 (e.g., threshold area) for a vector path to qualify as textual content.

In one or more embodiments, to apply the minimum coverage constraint 564, the vector text extraction system 106 determines an average character coverage area 560. In particular, the vector text extraction system 106 determines an average character coverage area 560 based on an approximate size of characters within the textual content. In some cases, the vector text extraction system 106 determines the average character coverage area 560 to be the bounding box area 561 divided by the total number of characters 562 in the textual content. To illustrate, for a bounding box area 561 of 100 square pixels for a word "HOME," the vector text extraction system 106 assigns the average character coverage area 550 a value of 25 square pixels corresponding to the bounding box area 561 (e.g., 100 square pixels) divided by the total number of characters 562 (e.g., 4).

Furthermore, the vector text extraction system 106 utilizes the minimum character coverage area 565 to apply the minimum coverage constraint 564. In particular, the vector text extraction system 106 determines the minimum character coverage area 565 for a vector path to qualify as textual content based on a character minimum coverage factor and the average character coverage area 560. For example, the vector text extraction system 106 utilizes the character minimum coverage factor to calculate the minimum character coverage area 565 as a multiple of the average character coverage area 560 (e.g., character minimum coverage factor*average character coverage area 560). In one or more embodiments, the vector text extraction system 106 evaluates the textual content to determine the character minimum coverage factor based on the character dimensions of the textual content. To illustrate, the vector text extraction system 106 determines the character minimum coverage factor by based on the character dimensions of one or more narrow and short characters such as lowercase "i". In some cases, the vector text extraction system 106 determines the character minimum coverage factor to be 0.35 (e.g., 35 percent of the average character area).

As further shown, the vector text extraction system 106 determines the filtered intersecting vector paths 568 by applying the minimum coverage constraint 564. For example, the vector text extraction system 106 applies the minimum coverage constraint 564 by comparing the minimum character coverage area 565 to a vector path area 566.

In one or more embodiments, if the minimum character coverage area 565 is greater than the vector path area 566 (e.g., area of vector path 567), the vector text extraction system 106 removes the vector path 567 to generate the filtered intersecting vector paths 568. As shown, the vector text extraction system 106 filters the intersecting vector paths 510*d* using the minimum coverage constraint 564 to determine the filtered intersecting vector paths 568.

In one or more embodiments, the vector text extraction system 106 utilizes the following algorithm for the minimum coverage constraint 564 to determine the filtered intersecting vector paths 568:

Algorithm 4 Minimum Coverage Constraint

Require: Path Area(P), Bounding Box Area($A_b$)
1. procedure MINIMUM COVERAGE CONSTRAINT(P, Ω)
2. f ← 35 percent ▷ f denotes Character Minimum Coverage Factor
3. $A_{mn} \leftarrow f * \frac{A_b}{N}$ ▷ $N$ denotes number of characters
4. if P >= $A_{mn}$ then ▷ $A_{mn}$ denotes Minimum Character Coverage Area
5. Accept vector path as Textual Content
6. else
7. Discard vector path as noise As shown in Algorithm 4, the vector text extraction system 106 retains the filtered intersecting vector paths 568 that satisfy the minimum character coverage area 565 (e.g., $A_{mn}$) by retaining the intersecting vector paths 510*c* (e.g., P) based on the character minimum coverage factor (e.g., f).

Figure 5E:
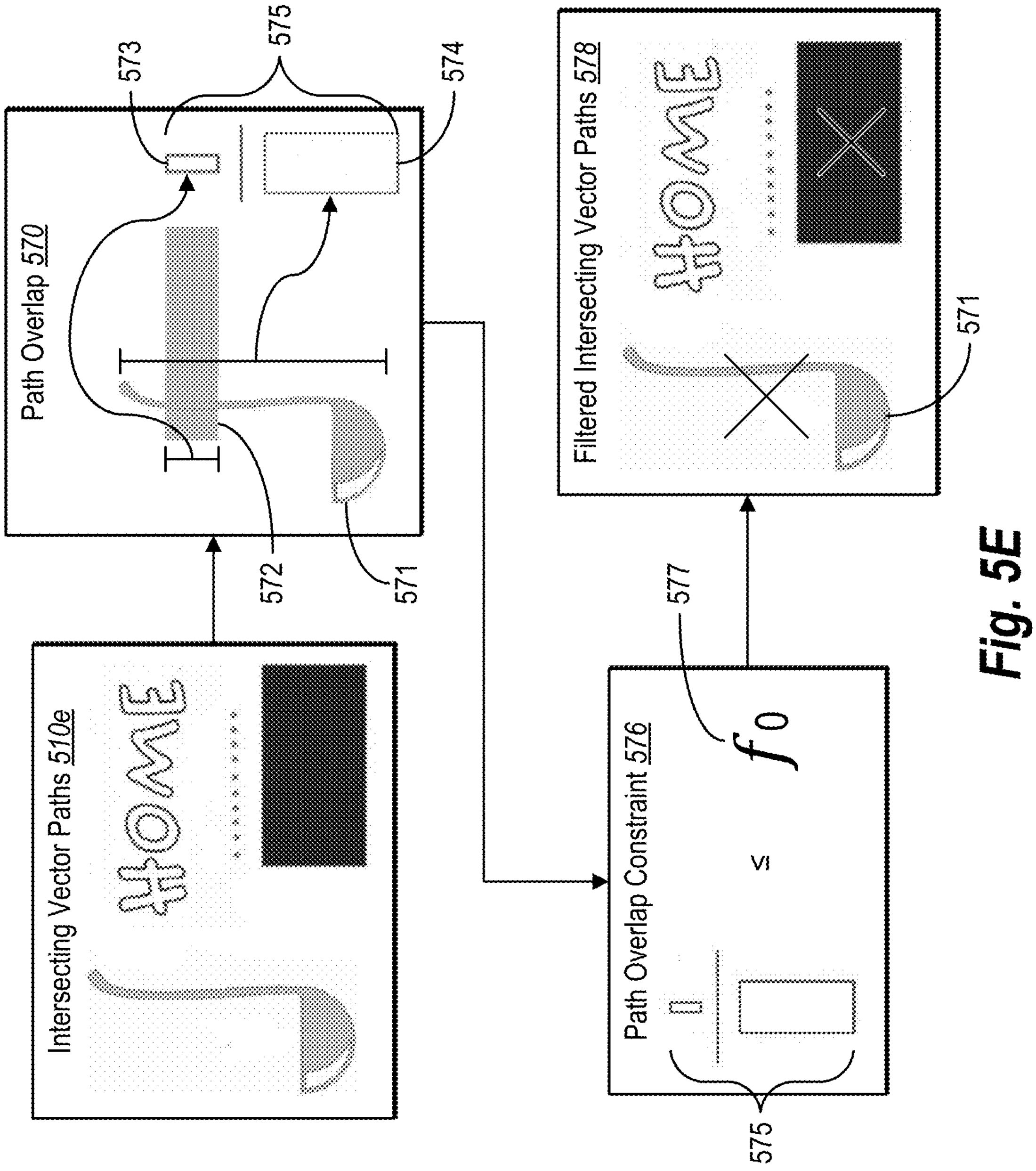
FIG. 5E illustrates an example of extracting textual content from a set of intersecting vector paths utilizing a path overlap constraint in accordance with one or more embodiments.

As mentioned, in some cases, the vector text extraction system 106 utilizes the path overlap constraint 576 to filter intersecting vector paths where the overlapping area of the intersecting vector paths 510*e* is less than a threshold amount of the entire vector path. FIG. 5E illustrates an example of extracting textual content from the intersecting vector paths 510*e* utilizing the path overlap constraint 576 in accordance with one or more embodiments.

As shown in FIG. 5E, in one or more embodiments, the vector text extraction system 106 determines that the intersecting vector paths 510*e* include one or more vector paths (e.g., vector path 57) that cover an area outside of the bounding box 572 as well as area inside of the bounding box 572. In these embodiments, the vector text extraction system 106 utilizes the path overlap constraint 576 to compare the areas of the intersecting vector paths 510*e* with areas of overlap of the intersecting vector paths 510*e* with the bounding box 572. In particular, the vector text extraction system 106 utilizes the path overlap constraint 576 to determine if at least a threshold area of the intersecting vector paths 510*e* overlap with the bounding box 572 for the intersecting vector paths 510*e* to qualify as textual content.

To apply the path overlap constraint 576, the vector text extraction system 106 determines a path overlap 570. To illustrate, for a vector path 571 of the intersecting vector paths 510*e*, the vector text extraction system 106 determines an overlap path area 573 corresponding to the area of the vector path 571 which overlaps with the bounding box 572. Furthermore, the vector text extraction system 106 determines a path area 574 corresponding to the area of the vector path 571. As shown, the vector text extraction system 106 determines a path overlap ratio 575 of the overlap path area 573 to the path area 574 (e.g. the overlap path area 573 divided by the path area 574) to determine a relative amount of the vector path 571 which overlaps the bounding box 572.

Furthermore, the vector text extraction system 106 applies the path overlap constraint 576 based on the path overlap 570 to determine the filtered intersecting vector paths 578. To continue the example of vector path 571, the vector text extraction system 106 compares the path overlap ratio 575 of the vector path 571 to a path minimum overlap factor 577 to determine if the vector path 571 qualifies as textual content. If the path overlap ratio 575 is less than the path minimum overlap factor 577, the vector text extraction system 106 discards the vector path 571 as noise to determine the filtered intersecting vector paths 578. In one or more embodiments, the vector text extraction system 106 utilizes a path minimum overlap factor 577 of 0.65 (e.g., 65 percent).

As shown, the vector text extraction system 106 filters the intersecting vector paths 510*e* using the path overlap constraint 576 to generate the filtered intersecting vector paths 578. In one or more embodiments, the vector text extraction system 106 utilizes the following algorithm for the path overlap constraint 576 to generate the filtered intersecting vector paths 578:

Algorithm 5 Path Overlap Constraint
Require: Path Area($P$), Overlap Path Area($\Omega$)

```
procedure PATH OVERLAP CONSTRAINT(P, Ω)
    f0 ← 65 percent    ▷f denotes Path Minimum Overlap Factor
    if Ω >= f0 * P then
        Accept vector path as Textual Content
    else
        Discard vector path as noise
```

As shown in Algorithm 5, the vector text extraction system 106 filters the intersecting vector paths 510*e* (e.g., P) using the path overlap constraint 576 to generate the filtered intersecting vector paths 578 that satisfy the path minimum overlap factor 577 (e.g., $f_0$).

Figure 5F:
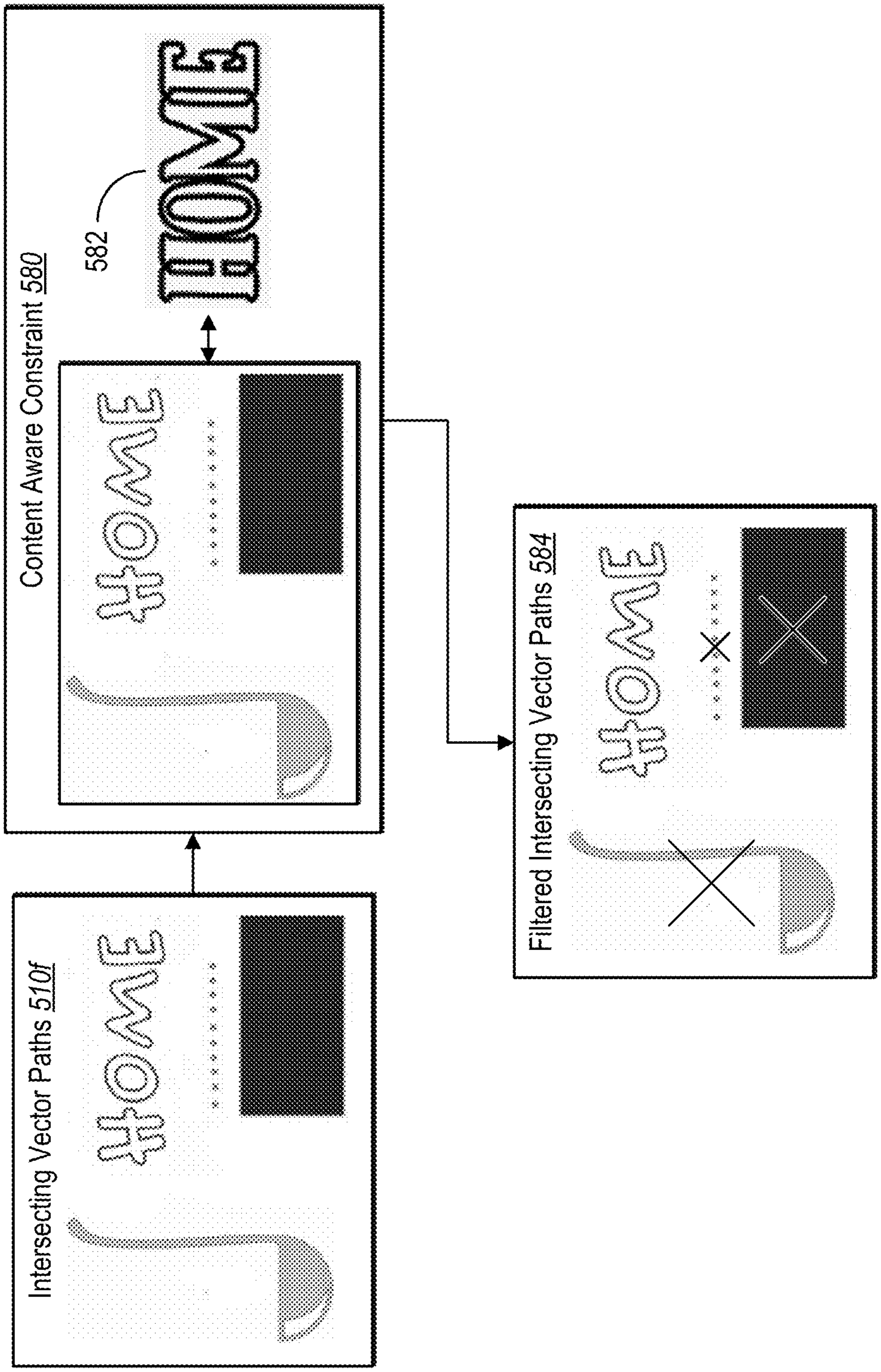
FIG. 5F illustrates an example of extracting textual content from a set of intersecting vector paths utilizing a content aware constraint in accordance with one or more embodiments.

As mentioned, in some cases, the vector text extraction system 106 utilizes a content aware constraint 580 to filter intersecting vector paths by comparing characteristics of the intersecting vector paths 510*f* to characteristics from content metadata of character vectors. FIG. 5F illustrates an example of extracting textual content from the intersecting vector paths 510*f* utilizing the content aware constraint 580 in accordance with one or more embodiments.

For example, as shown in FIG. 5F, the vector text extraction system 106 compares the intersecting vector paths 510*f* with properties of character vectors (e.g., as defined by content metadata) to identify and isolate the textual content. In some cases, the vector text extraction system 106 utilizes the content aware constraint 580 to selectively remove one or more of the intersecting vector paths 510*f* based a comparison of the intersecting vector paths 510*f* to the content metadata corresponding to the textual content identified by the OCR model (e.g., characters, words, bounding boxes). In one or more embodiments, the vector text extraction system 106 utilizes content metadata including font type, font language, font size, font case (e.g., upper or lower), font modifications (e.g., italics or bold), path count, stroke width, aspect ratio, path complexity, path size, path shape, path spacing, color consistency, character kerning, enclosed paths, and/or character alignment for the content aware constraint 580.

In particular, the vector text extraction system 106 compares the content metadata of character vectors for characters within the textual content with the intersecting vector paths 510*f* to generate the filtered intersecting vector paths 584. To illustrate, as shown in FIG. 5F, the vector text extraction system 106 compares the properties of the intersecting vector paths 510*f* with the content metadata of vector text 582 (e.g., "HOME") by comparing the content metadata such as width, specific curvature, relative positioning, and font type. As another example, the vector text extraction system 106 compares the path count of the intersecting vector paths 510*f* to a predicted path count (e.g., uppercase "I" has 1 path, lowercase "i" has 2 paths) of the textual content. As another example, the vector text extraction system 106 compares the vector contours (e.g., jagged, irregular, smooth) of the intersecting vector paths to the expected contours of the textual content. As another example, the vector text extraction system 106 compares the intersecting vector paths 510*f* to a predicted enclosed path (e.g., "O" has 1 enclosed path, "M" has no enclosed paths) of the textual content.

Furthermore, the vector text extraction system 106 filters the intersecting vector paths 510*f* using the content aware constraint 580 to generate the filtered intersecting vector paths 584. In one or more embodiments, the vector text extraction system 106 utilizes a content aware tolerance threshold. The content aware tolerance threshold corresponds to an allowable level of discrepancies between the intersecting vector paths 510*f* and the content metadata of the character vectors. The vector text extraction system 106 utilizes the content aware tolerance threshold to account for minor variations an inaccuracies and accurately identify textual content even when slight deviations are present. In particular, the vector text extraction system 106 compares the intersecting vector paths 510*f* with the content metadata for character vectors within the textual content and removes the intersecting vector paths 510*f* that differ according to the content aware tolerance threshold.

To further illustrate, the vector text extraction system 106 provides an efficient, intuitive graphical user interface for extracting vector text from a vector image. FIGS. 6A-6D illustrate an example of selecting text vector paths for textual content within a vector image utilizing a graphical user interface in accordance with one or more embodiments.

Figure 6A:
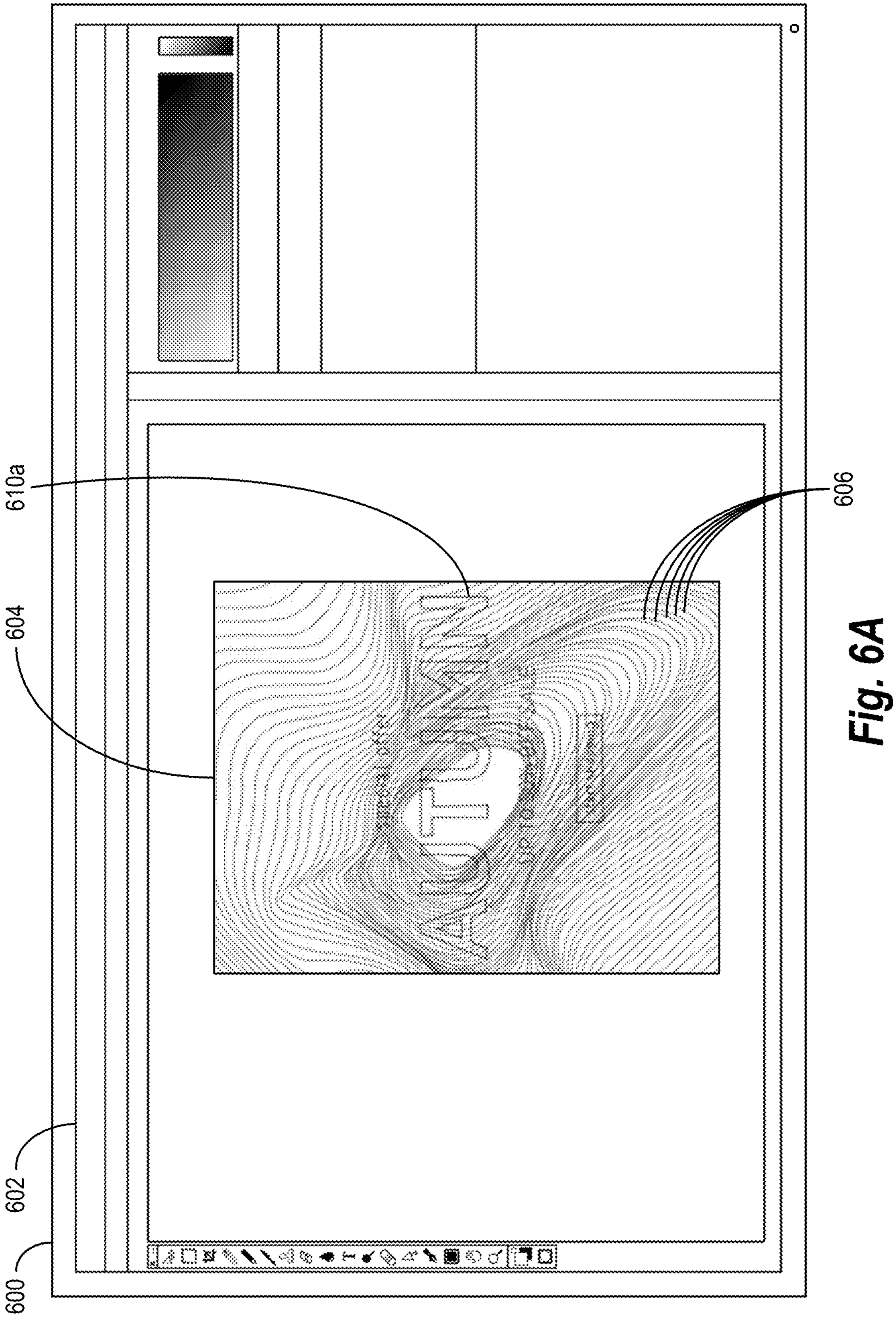
FIGS. 6A-6D illustrate an example of selecting text vector paths for textual content within a vector image utilizing a graphical user interface in accordance with one or more embodiments.

As shown in FIG. 6A, the vector text extraction system 106 interacts with a client device 600 utilizing a graphical user interface 602 of a vector-based application (e.g., an image editing application for generating or editing vector images) to modify a vector image 604. In particular, the vector image 604 includes multiple overlapping vector paths and multiple textual elements. As shown, the vector image 604 includes text vector paths 610*a* corresponding to vector outlines for the textual content "AUTUMN."

Notably, the vector text extraction system 106 accurately differentiates between the text vector paths 610*a* and overlapping vector content as described in relation to FIGS. 2-5F. The complex vector paths within the vector image 604 illustrate the challenge of distinguishing between overlapping vector paths. For example, existing computing systems struggle to differentiate between the text vector paths 610*a* corresponding to textual content within the vector image 604 and nearby or overlapping non-textual paths within the vector image 604. These systems often inaccurately identify or fail to distinguish textual content from not-textual content.

In contrast, the vector text extraction system 106 distinguishes between the text vector paths 610*a* and overlapping vector content to accurately extract the textual content. For example, the vector text extraction system 106 analyzes the vector image 604 to provide text vector paths and bounding boxes without confusing the textual content with the background paths. To illustrate, as discussed in relation to FIGS. 6B-6D, the vector text extraction system 106 accurately distinguishes between the text vector paths 610*a* and the overlapping vector paths 606 (as well as the additional vector paths).

Figure 6B:
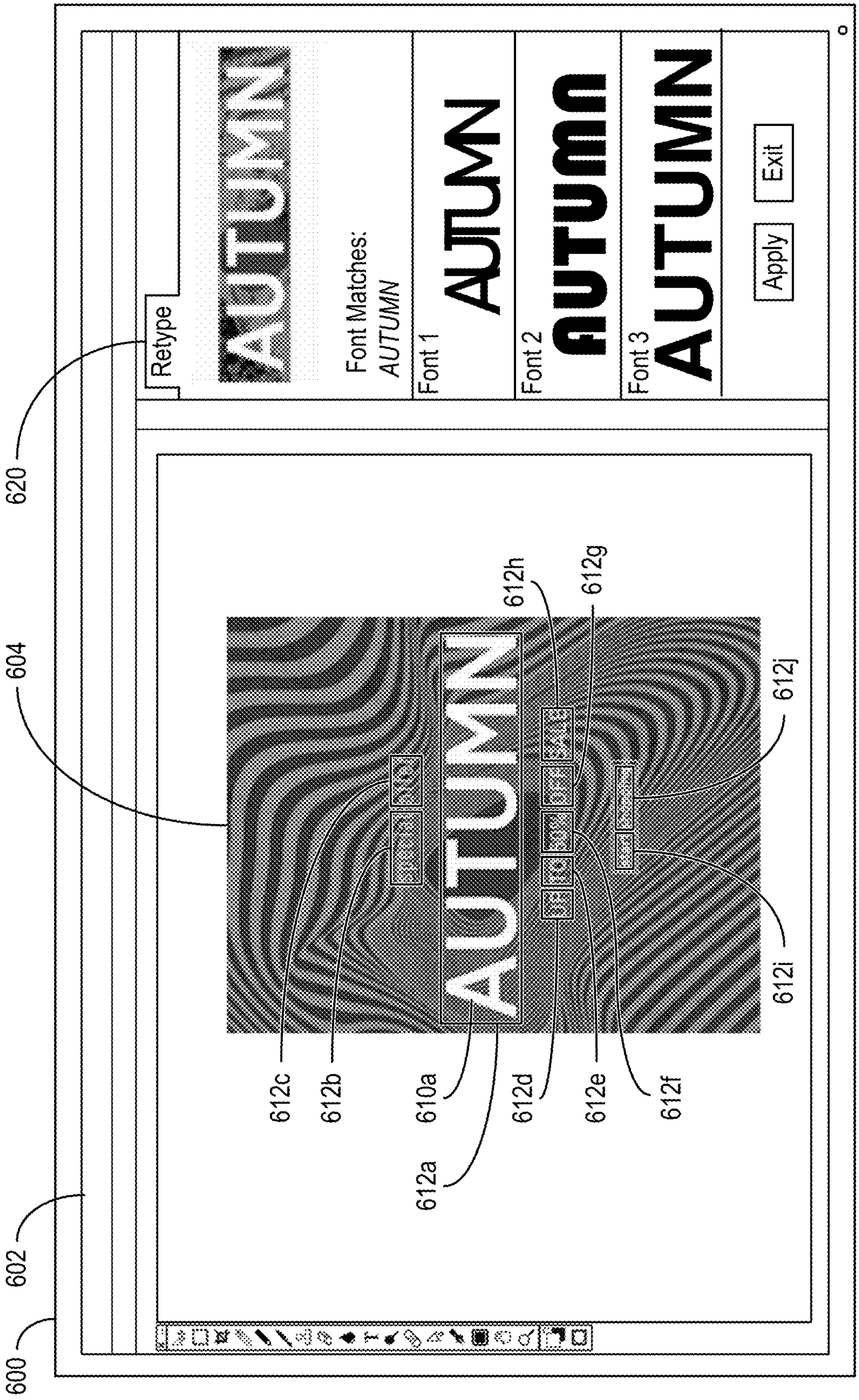

Turning to FIG. 6B, the vector text extraction system 106 provides the graphical user interface 602 to select textual content within the vector image 604. In one or more embodiments, the vector text extraction system 106 identifies the textual content within the vector image 604 and provides an interface to select, modify, and/or delete the textual content. In particular, the vector text extraction system 106 identifies the textual content within the graphical user interface 602 enclosed by bounding boxes 612*a*-612*j*. As shown, the vector text extraction system 106 provides interface options 620 to interact with (and select) the textual content.

In addition, the vector text extraction system 106 provides options to efficiently select the text vector paths within the vector image 604 as described in relation to FIGS. 2-5F. For example, the vector text extraction system 106 provides an option to select text vector paths outlining the textual content. In particular, the vector text extraction system 106 selects, in response to a single input from the client device 600 the text vector paths 610*a* (e.g., "AUTUMN") for display within the graphical user interface 602. For example, based on a client device interaction of a click on the word "AUTUMN" (and/or the text vector paths 610*a*), the vector text extraction system 106 selects the text vector paths 610*a* outlining the word "AUTUMN."

Figure 6C:
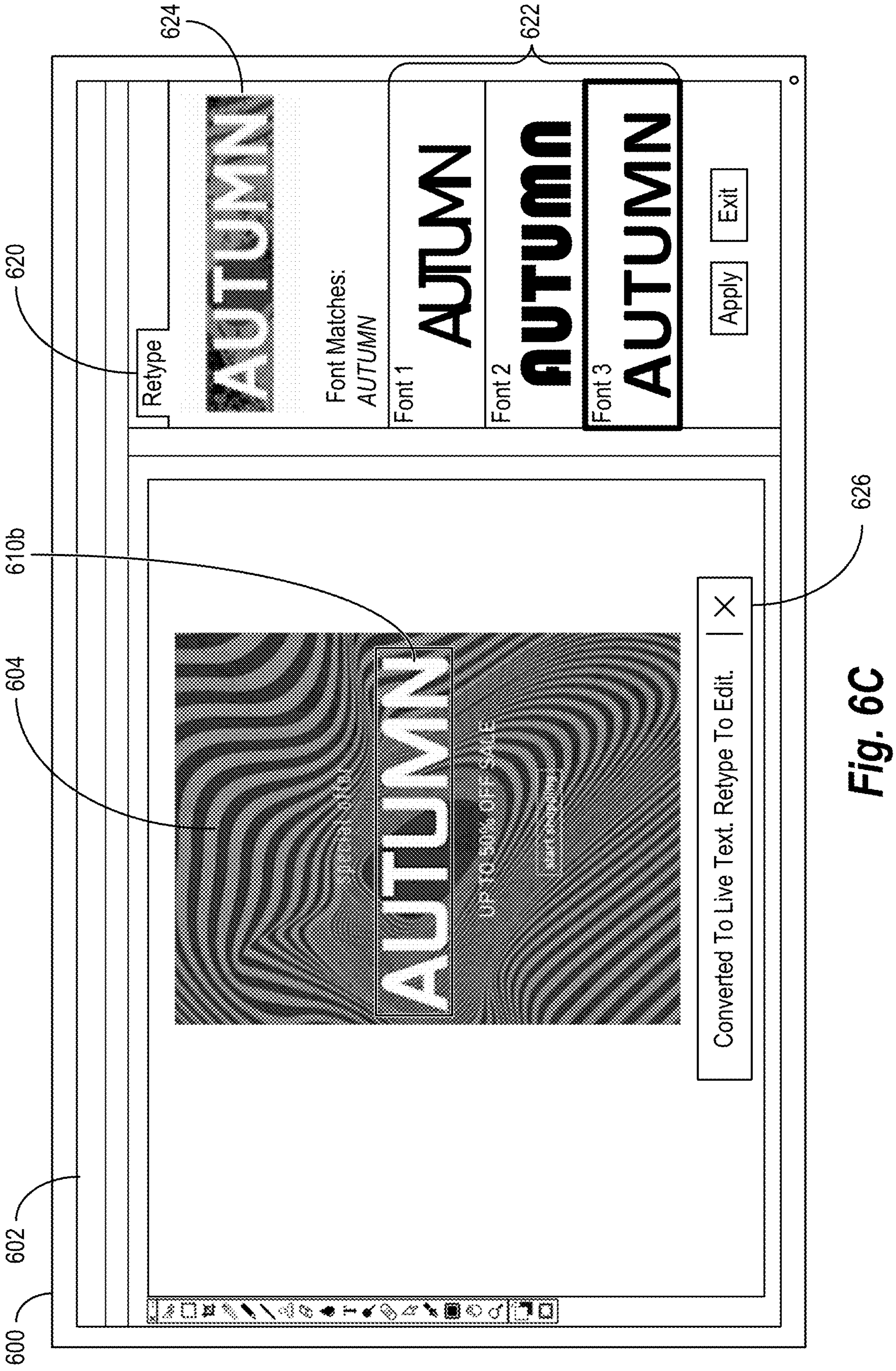

In one or more embodiments, the vector text extraction system 106 enables downstream operations on the textual content within the vector image 604. For example, as shown in FIG. 6C, the vector text extraction system 106 can perform downstream operations on the text vector paths 610*a*.

As shown, the vector text extraction system 106 can convert the text vector paths 610*a* into editable text (e.g., live text) associated with a font. In particular, the vector text extraction system 106 converts the text vector paths 610*a* into the text vector paths 610*b* which are associated with a specific font (e.g., as opposed to a fixed graphic element). To illustrate, based on a client device interaction with a font selection tool 622, the vector text extraction system 106 can replace and/or modify the text vector paths 610*a* to editable text (e.g., "AUTUMN") associated with the font "Font 3" as shown by text vector paths 610*b*.

In one or more embodiments, the vector text extraction system 106 provides client device feedback regarding one or more changes to the text vector paths 610*b*. For example, the vector text extraction system 106 provides a status window 624 to display information about changes to the text vector paths 610*b*. As another example, the vector text extraction system 106 provides an update message 626 which includes a visual indication of changes to the text vector paths 610*b*.

Figure 6D:
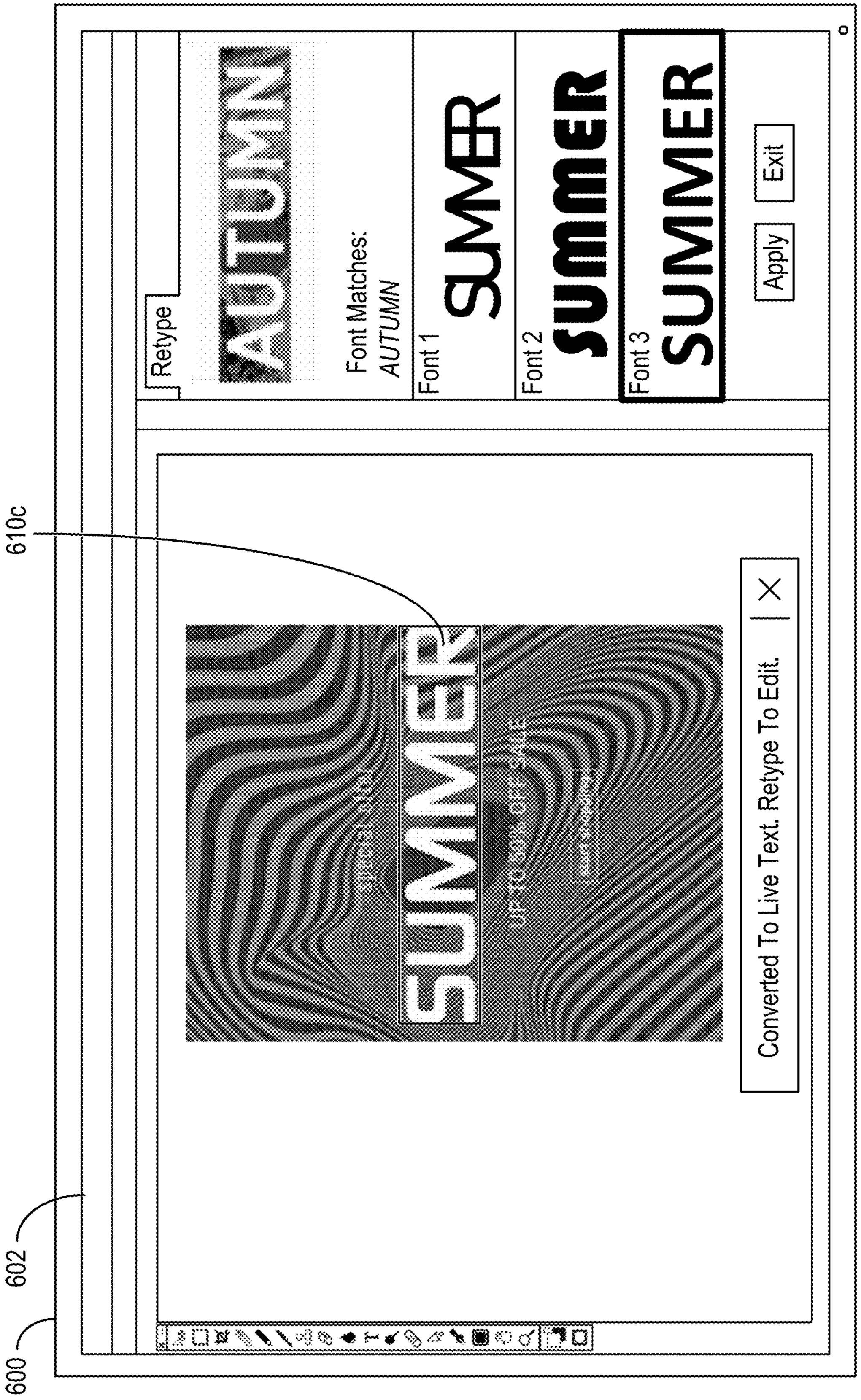

Turning to FIG. 6D, the vector text extraction system 106 can additional downstream operations on the text vector paths 610*b*. As shown, the vector text extraction system 106 can replace the text vector paths 610*b* with new textual content "SUMMER" (e.g., the text vector paths 610*c*). In one or more embodiments, the vector text extraction system 106 can perform additional operations to modify the text vector paths 610*c* such as moving paths, deleting paths, resizing paths, rotating paths, grouping paths, applying effects, and/or changing color. Indeed, with few client device interactions (e.g., a single click), the vector text extraction system 106 can select one or more text vector paths within the vector image 604 for various downstream operations available within the vector design application.

Figure 7:
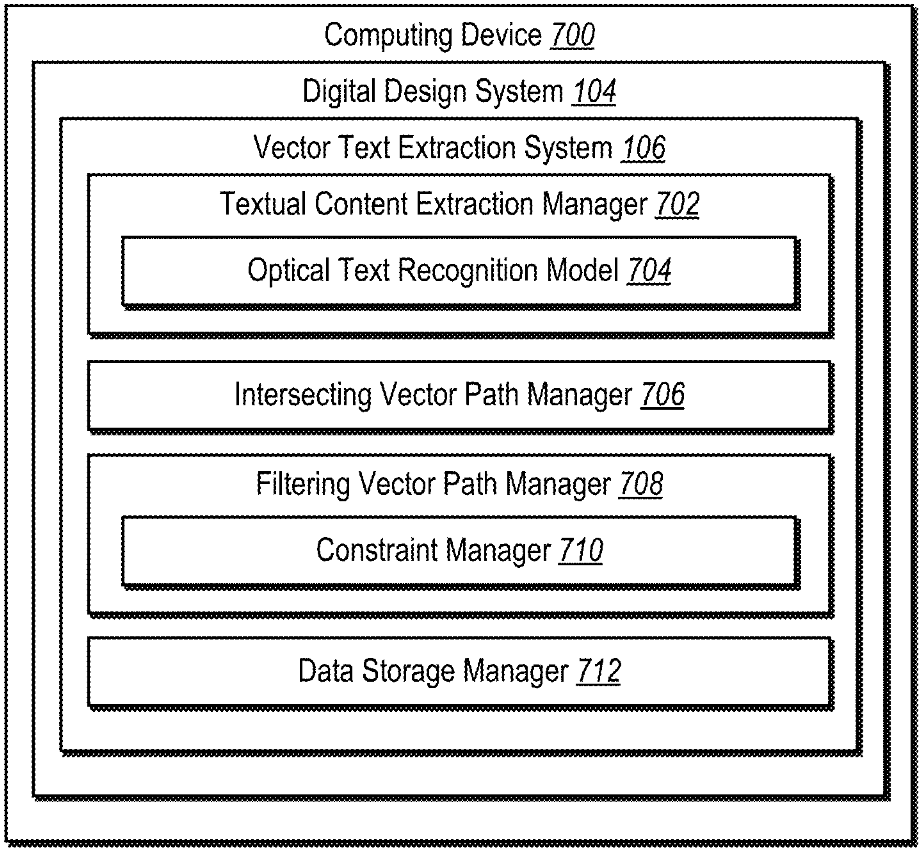
FIG. 7 illustrates a diagram of an example architecture of the vector text extraction system in accordance with one or more embodiments.

Turning now to FIG. 7, additional detail will now be provided regarding various components and capabilities of the vector text extraction system 106. In particular, FIG. 7 illustrates the vector text extraction system 106 implemented by the computing device 700 (e.g., the server device(s) 102 and/or one of the client device(s) 110 discussed above with reference to FIG. 1). Additionally, the vector text extraction system 106 is also part of the digital design system 104. As shown in FIG. 7, the vector text extraction system 106 includes, but is not limited to, a textual content extraction manager 702, an intersecting vector path manager 706, a filtering vector path manager 708, and a data storage manager 712.

As just mentioned, and as illustrated in FIG. 7, the vector text extraction system 106 includes the textual content extraction manager 702. In one or more embodiments, the textual content extraction manager 702 manages the extraction of textual content within the raster image. The textual content extraction manager 702 utilizes an optical text recognition model 704 to perform content analysis to identify and extract textual content from within vector images. In addition, the textual content extraction manager 702 utilizes the optical text recognition model 704 to generate bounding boxes corresponding to the textual content.

As shown in FIG. 7, the vector text extraction system 106 includes the intersecting vector path manager 706. The intersecting vector path manager 706 performs candidate outline filtering to determine a set of intersecting vector paths that overlap the bounding boxes corresponding to the textual content. In particular, the intersecting vector path manager 706 determines the intersecting vector paths, the vector text extraction system identifies all vector paths in a vector image and organizes the vector paths into a sorted data structure by sorting according to coordinate locations (e.g., pixel locations) of the vector paths. For example, the intersecting vector path manager 706 searches the data structure for vector paths with one or more edges positioned within the bounding box to determine the intersecting vector paths.

As further shown in FIG. 7, the vector text extraction system 106 includes the filtering vector path manager 708. In particular, the vector text extraction system 106 utilizes the filtering vector path manager 708 to perform conditional candidate outline pruning to refine the selected vector paths by employing various constraints to the set of intersecting vector paths to determine a set of text vector paths that outlines the textual content. In particular, in certain embodiments, the filtering vector path manager 708 utilizes a constraint manager 710 to manage a background constraint, a coverage constraint, a path overlap constraint, and a content aware constraint. For example, the constraint manager 710 utilizes the background constraint to filter vector paths with area larger than the bounding box. Furthermore, in some cases, the constraint manager 710 utilizes the vector text extraction system utilizes the coverage constraint to filter vector paths with a coverage area larger than a maximum character area or less than a minimum character area. In particular, in one or more embodiments, the constraint manager 710 utilizes the path overlap constraint to filter vector paths where the overlapping area of the vector path is less than a threshold amount of the entire vector path. In one or more embodiments, the constraint manager 710 utilizes the content aware constraint to filter vector paths by comparing characteristics of the vector paths to characteristics from content metadata of character vectors.

Additionally, as shown, the vector text extraction system 106 includes data storage manager 712. In particular, data storage manager 712 (implemented by one or more memory devices) stores the digital design documents, including the raster images. The data storage manager 712 facilitates the use of the digital design documents by the vector text extraction system 106.

Each of the components 702-712 of the vector text extraction system 106 includes software, hardware, or both. For example, the components 702-712 include one or more instructions stored on a computer-readable storage medium and executable by processors of one or more computing devices, such as a client device or server device. When executed by the one or more processors, the computer-executable instructions of the vector text extraction system 106 causes the computing device(s) to perform the methods described herein. Alternatively, the components 702-712 include hardware, such as a special-purpose processing device to perform a certain function or group of functions. Alternatively, the components 702-712 of the vector text extraction system 106 include a combination of computer-executable instructions and hardware.

Furthermore, the components 702-712 of the vector text extraction system 106 are implemented as one or more operating systems, as one or more stand-alone applications, as one or more modules of an application, as one or more plug-ins, as one or more library functions or functions called by other applications, and/or as a cloud-computing model. Thus, in some embodiments, the components 702-712 of the vector text extraction system 106 are implemented as a stand-alone application, such as a desktop or mobile application. Furthermore, in some embodiments, the components 702-712 of the vector text extraction system 106 are implemented as one or more web-based applications hosted on a remote server. Alternatively, or additionally, the components 702-712 of the vector text extraction system 106 are implemented in a suite of mobile device applications or "apps." For example, in one or more embodiments, the vector text extraction system 106 comprises or operates in connection with digital software applications such as: ADOBE® PHOTOSHOP®, ADOBE® ILLUSTRATOR®, ADOBE® STOCK®, ADOBE® SPARK POST, ADOBE® INDESIGN®, and ADOBE® ACROBAT® MOBILE, ADOBE® SPARK PAGE, ADOBE® FRESCO. The foregoing are either registered trademarks or trademarks of Adobe Inc. in the United States and/or other countries.

Figure 8:
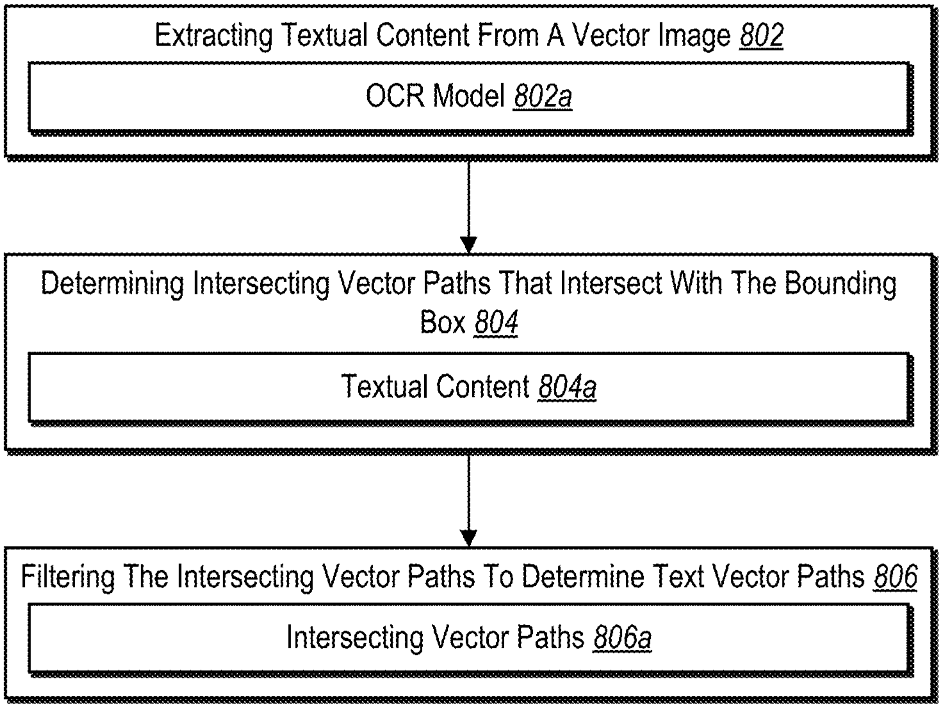
FIG. 8 illustrates a flowchart of a series of acts for extracting text vector paths from a vector image in accordance with one or more embodiments.

FIGS. 1-7, the corresponding text, and the examples provide a number of different methods, systems, devices, and non-transitory computer-readable media of the vector text extraction system 106. In addition to the foregoing, one or more embodiments are also described in terms of flowcharts comprising acts for accomplishing a particular result, as shown in FIG. 8. In some embodiments, the acts shown in FIG. 8 are performed in connection with more or fewer acts. Further, the acts may be performed in differing orders. Additionally, in various embodiments, the acts described herein are repeated or performed in parallel with one another or parallel with different instances of the same or similar acts. A non-transitory computer-readable medium includes instructions that, when executed by one or more processors, cause a computing device to perform the acts of FIG. 8. In some embodiments, a system is configured to perform the acts of FIG. 8. Alternatively, the acts of FIG. 8 are performed as part of a computer-implemented method.

FIG. 8 illustrates a flowchart of a series of acts 800 for modifying a digital document with a vector text extraction system 106 in accordance with one or more embodiments. While FIG. 8 illustrates acts according to one embodiment, alternative embodiments omit, add to, reorder, and/or modify any acts shown in FIG. 8.

FIG. 8 illustrates an example series of acts 800 for utilizing a vector text extraction system 106 to generate a vector path. In particular, in certain embodiments, the series of acts 800 includes an act 802 of extracting textual content from a vector image. Specifically, in one or more embodiments, the act 802 includes extracting, from a vector image using an optical character recognition (OCR) model 802*a*, textual content and a bounding box corresponding to the textual content. In particular, in certain embodiments, the series of acts 800 includes an act 804 of determining intersecting vector paths that intersect with the bounding box. In particular, in one or more embodiments, the act 804 includes determining, from the textual content 804*a*, intersecting vector paths comprising one or more vector paths of the vector image that intersect with the bounding box. As illustrated, in some embodiments, the series of acts 800 also includes an act 806 of filtering the intersecting paths to determine text vector paths. In particular, in one or more embodiments, the act 806 includes filtering the intersecting vector paths 806*a* to determine text vector paths outlining the textual content by removing, from the intersecting vector paths, one or more intersecting vector paths corresponding to non-textual elements.

In addition (or in the alternative) to the acts described above, in certain embodiments, the vector text extraction system series of acts 800 includes removing the one or more intersecting vector paths according to a background constraint comprising a comparison of areas of the intersecting vector paths with an area of the bounding box. In some embodiments, the series of acts 800 also includes removing the one or more intersecting vector paths according to a coverage constraint comprising a comparison of areas of the intersecting vector paths with a character area associated with a character within the textual content. Moreover, in one or more embodiments, the vector text extraction system 106 series of acts 800 includes removing the one or more intersecting vector paths according to a path overlap constraint comprising a comparison of the areas of the intersecting vector paths with areas of overlap of the intersecting vector paths with the bounding box.

Further still, in some embodiments, the vector text extraction system 106 series of acts 800 includes removing the one or more intersecting vector paths based on a content aware constraint comprising a comparison of the intersecting vector paths with content metadata of character vectors. Furthermore, in one or more embodiments, the vector text extraction system series of acts 800 includes providing, for display within a graphical user interface of a client device, an option to select the textual content. Moreover, one or more embodiments, the series of acts 800 includes selecting, in response to a single input from the client device selecting the textual content, the text vector paths for display within the graphical user interface of the client device.

Further still, in one or more embodiments, the series of acts 800 includes generating, from the one or more vector paths, one or more sets of sorted vector paths based on horizontal positions and vertical positions of the one or more vector paths within the vector image. Moreover, in one or more embodiments, the series of acts 800 includes selecting the intersecting vector paths using a binary search on the one or more sets of sorted vector paths. In certain embodiments, the series of acts 800 further includes generating one or more path lists from the binary search on the one or more sets of sorted vector paths. Moreover, one or more embodiments, the series of acts 800 includes determining a union of path lists to indicate the intersecting vector paths.

Furthermore, in one or more embodiments, the series of acts 800 includes retaining a first set of vector paths comprising the one or more vector paths with one or more of a left edge or a right edge within a horizontal span of the bounding box. Moreover, in one or more embodiments, the series of acts 800 includes retaining a second set of vector paths comprising the one or more vector paths with one or more of a top edge or a bottom edge within a vertical span of the bounding box. In one or more embodiments, the series of acts 800 includes extracting textual content corresponding to a word within the vector image.

Further still, in one or more embodiments, the series of acts 800 includes determining a bounding box corresponding to textual content within a vector image. Moreover, in one or more embodiments, the series of acts 800 includes identifying a plurality of vector paths depicted in the vector image. In one or more embodiments, the series of acts 800 further includes generating, from the plurality of vector paths, one or more sets of sorted vector paths based on locations of the plurality of vector paths within the vector image. In addition, in one or more embodiments, the series of acts 800 includes determining, using a binary search on the one or more sets of sorted vector paths, intersecting vector paths that intersect the bounding box of the textual content.

Furthermore, in one or more embodiments, the series of acts 800 includes determining a minimum coverage constraint for a character of the textual content based on a minimum character area for the character. In addition, in one or more embodiments, the series of acts 800 includes filtering the intersecting vector paths by removing vector paths of the intersecting vector paths that do not satisfy the minimum coverage constraint. Moreover, in one or more embodiments, the series of acts 800 includes determining a maximum coverage constraint for a character within the textual content based on a maximum character area for the character. In one or more embodiments, the series of acts 800 includes filtering the intersecting vector paths by removing vector paths of the intersecting vector paths that do not satisfy the maximum coverage constraint.

Furthermore, in one or more embodiments, the series of acts 800 includes determining the maximum character area based on a number of characters in the textual content, an area of the bounding box, and a character coverage factor. In some embodiments, the series of acts 800 also includes determining a content aware constraint for a character of the textual content based on comparing a number of the intersecting vector paths to a number of predicted vector paths. Moreover, in one or more embodiments, the vector text extraction system 106 series of acts 800 includes filtering the intersecting vector paths by removing vector paths of the intersecting vector paths that do not satisfy the content aware constraint.

Further still, in some embodiments, the vector text extraction system 106 series of acts 800 includes providing, for display within a graphical user interface of a client device, an option to select text vector paths outlining the textual content. Furthermore, in one or more embodiments, the vector text extraction system series of acts 800 includes filtering the intersecting vector paths to determine the text vector paths outlining the textual content by removing one or more of the intersecting vector paths corresponding to non-textual elements. Moreover, one or more embodiments, the series of acts 800 includes providing, in response to an input from the client device, the text vector paths outlining the textual content for display within the graphical user interface of the client device. Further still, in one or more embodiments, the series of acts 800 includes selecting, from the one or more sets of sorted vector paths, at least one intersecting vector path comprising one or more of a left edge, a right edge, a bottom edge, or a top edge positioned within the bounding box.

Moreover, in one or more embodiments, the series of acts 800 includes determining, for a vector image, a set of intersecting vector paths that intersect a bounding box outlining textual content depicted in the vector image. In certain embodiments, the series of acts 800 further includes filtering the set of intersecting vector paths to determine one or more text vector paths that outline the textual content according to a background constraint comprising a comparison of areas of the set of intersecting vector paths with an area of the bounding box. Moreover, one or more embodiments, the series of acts 800 includes filtering the set of intersecting vector paths to determine one or more text vector paths that outline the textual content according to a coverage constraint comprising a comparison of areas of the set of intersecting vector paths with character area within the textual content. Furthermore, in one or more embodiments, the series of acts 800 includes filtering the set of intersecting vector paths to determine one or more text vector paths that outline the textual content according to a path overlap constraint comprising a comparison of the areas of the set of intersecting vector paths with areas of overlap of the set of intersecting vector paths with the bounding box.

Moreover, in one or more embodiments, the series of acts 800 includes removing one or more intersecting vector paths wherein the area of the one or more intersecting vector paths is less than a minimum character area corresponding to the bounding box or the area of the one or more intersecting vector paths is more than a maximum character area corresponding to the bounding box. In one or more embodiments, the series of acts 800 includes extracting the textual content and the bounding box outlining the textual content from the vector image using an optical character recognition (OCR) model. Further still, in one or more embodiments, the series of acts 800 includes selecting vector paths from the vector image having one or more of a left edge, a right edge, a bottom edge, or a top edge positioned within the bounding box. Moreover, in one or more embodiments, the series of acts 800 includes filtering the set of intersecting vector paths to determine one or more text vector paths that outline the textual content is based on a content aware constraint comprising a comparison of the intersecting vector paths with content metadata of character vectors.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 9:
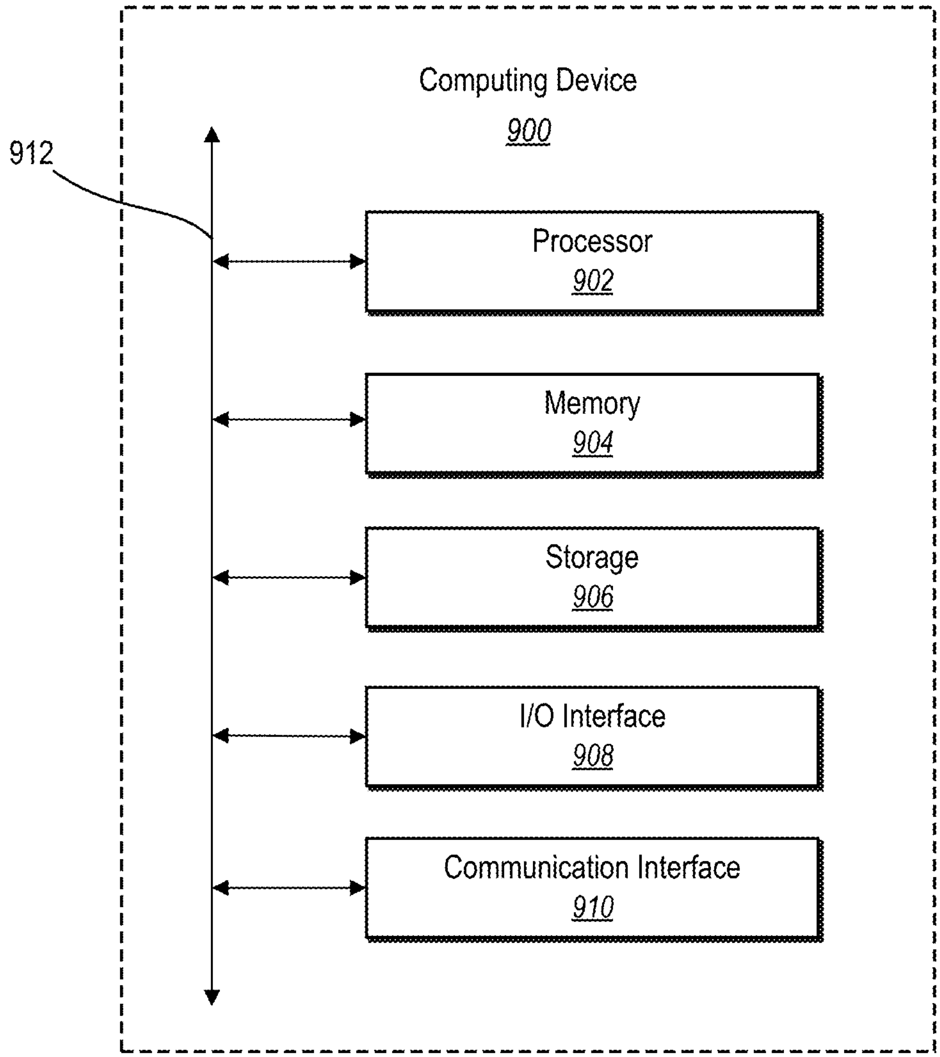
FIG. 9 illustrates a block diagram of an example computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., server device(s) 102, client device(s) 110, and computing device 900). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:

extracting, from a vector image using an optical character recognition (OCR) model, textual content and a bounding box corresponding to the textual content;

generating one or more sets of sorted vector paths within the vector image;

determining, by comparing the textual content with the one or more sets of sorted vector paths, intersecting vector paths comprising one or more vector paths of the vector image that intersect with the bounding box; and filtering the intersecting vector paths to determine text vector paths outlining the textual content by removing, from the intersecting vector paths, one or more intersecting vector paths corresponding to non-textual elements.

2. The computer-implemented method of claim 1, wherein filtering the intersecting vector paths comprises removing the one or more intersecting vector paths according to one or more of:

a background constraint comprising a comparison of areas of the intersecting vector paths with an area of the bounding box;

a coverage constraint comprising a comparison of areas of the intersecting vector paths with a character area associated with a character within the textual content; or a path overlap constraint comprising a comparison of the areas of the intersecting vector paths with areas of overlap of the intersecting vector paths with the bounding box.

3. The computer-implemented method of claim 1, wherein filtering the intersecting vector paths comprises removing the one or more intersecting vector paths based on a content aware constraint comprising a comparison of the intersecting vector paths with content metadata of character vectors.

4. The computer-implemented method of claim 1, further comprising:

providing, for display within a graphical user interface of a client device, an option to select the textual content; and selecting, in response to a single input from the client device selecting the textual content, the text vector paths for display within the graphical user interface of the client device.

5. The computer-implemented method of claim 1, further comprising:

generating the one or more sets of sorted vector paths based on horizontal positions and vertical positions of one or more vector paths within the vector image; and selecting the intersecting vector paths using a binary search on the one or more sets of sorted vector paths.

6. The computer-implemented method of claim 5, wherein selecting the intersecting vector paths further comprises:

generating one or more path lists from the binary search on the one or more sets of sorted vector paths; and determining a union of path lists to indicate the intersecting vector paths.

7. The computer-implemented method of claim 1, wherein filtering the intersecting vector paths further comprises:

retaining a first set of vector paths comprising the one or more vector paths with one or more of a left edge or a right edge within a horizontal span of the bounding box; and retaining a second set of vector paths comprising the one or more vector paths with one or more of a top edge or a bottom edge within a vertical span of the bounding box.

8. The computer-implemented method of claim 1, wherein extracting the textual content further comprises extracting textual content corresponding to a word within the vector image.

9. A system comprising:

one or more memory devices; and one or more processors coupled to the one or more memory devices, the one or more processors configured to cause the system to:

determine a bounding box corresponding to textual content within a vector image;

identify a plurality of vector paths depicted in the vector image;

generate, from the plurality of vector paths, one or more sets of sorted vector paths based on locations of the plurality of vector paths within the vector image; and determine, using a binary search comparing the one or more sets of sorted vector paths with the bounding box, intersecting vector paths that intersect the bounding box of the textual content.

10. The system of claim 9, wherein the one or more processors are further configured to filter the intersecting vector paths by:

determining a minimum coverage constraint for a character of the textual content based on a threshold character area for the character; and filtering the intersecting vector paths by removing vector paths of the intersecting vector paths that do not satisfy the minimum coverage constraint.

11. The system of claim 9, wherein the one or more processors are further configured to filter the intersecting vector paths by:

determining a maximum coverage constraint for a character within the textual content based on a threshold character area for the character; and filtering the intersecting vector paths by removing vector paths of the intersecting vector paths that do not satisfy the maximum coverage constraint.

12. The system of claim 11, wherein the one or more processors are further configured to cause the system to:

determine the threshold character area based on a number of characters in the textual content, an area of the bounding box, and a character maximum coverage factor.

13. The system of claim 9, wherein the one or more processors are further configured to filter the intersecting vector paths by:

determining a content aware constraint for a character of the textual content based on comparing a number of the intersecting vector paths to a number of predicted vector paths; and filtering the intersecting vector paths by removing vector paths of the intersecting vector paths that do not satisfy the content aware constraint.

14. The system of claim 9, wherein the one or more processors are further configured to cause the system to:

provide, for display within a graphical user interface of a client device, an option to select text vector paths outlining the textual content;

filter the intersecting vector paths to determine the text vector paths outlining the textual content by removing one or more of the intersecting vector paths corresponding to non-textual elements; and provide, in response to an input from the client device, the text vector paths outlining the textual content for display within the graphical user interface of the client device.

15. The system of claim 9, wherein the one or more processors are further configured to determine the intersecting vector paths by selecting, from the one or more sets of sorted vector paths, at least one intersecting vector path comprising one or more of a left edge, a right edge, a bottom edge, or a top edge positioned within the bounding box.

16. A non-transitory computer readable medium storing executable instructions which, when executed by a processing device, cause the processing device to perform operations comprising:

generating, for a vector image, one or more sets of sorted vector paths within the vector image;

determining, for the vector image, a set of intersecting vector paths that intersect a bounding box outlining textual content depicted in the vector image by comparing the bounding box with the one or more sets of sorted vector paths; and filtering the set of intersecting vector paths to determine one or more text vector paths that outline the textual content according to one or more of:

a background constraint comprising a comparison of areas of the set of intersecting vector paths with an area of the bounding box;

a coverage constraint comprising a comparison of areas of the set of intersecting vector paths with character area within the textual content; or a path overlap constraint comprising a comparison of the areas of the set of intersecting vector paths with areas of overlap of the set of intersecting vector paths with the bounding box.

17. The non-transitory computer readable medium of claim 16, wherein filtering the set of intersecting vector paths comprises removing one or more intersecting vector paths wherein:

the area of the one or more intersecting vector paths is less than a first threshold character area corresponding to the bounding box; or the area of the one or more intersecting vector paths is more than a second threshold character area corresponding to the bounding box.

18. The non-transitory computer readable medium of claim 16, further comprising:

extracting the textual content and the bounding box outlining the textual content from the vector image using an optical character recognition (OCR) model.

19. The non-transitory computer readable medium of claim 16, wherein determining the set of intersecting vector paths comprises selecting vector paths from the vector image having one or more of a left edge, a right edge, a bottom edge, or a top edge positioned within the bounding box.

20. The non-transitory computer readable medium of claim 16, wherein filtering the set of intersecting vector paths to determine one or more text vector paths that outline the textual content is further based on a content aware constraint comprising a comparison of the set of intersecting vector paths with content metadata of character vectors.

* * * * *